(12) United States Patent
Wheelwright et al.

(10) Patent No.: US 11,454,747 B1
(45) Date of Patent: Sep. 27, 2022

(54) SHADOW-MATCHED FRESNEL LENS DOUBLET FOR REDUCED OPTICAL ARTIFACTS

(71) Applicant: META PLATFORMS TECHNOLOGIES, LLC, Menlo Park, CA (US)

(72) Inventors: Brian Wheelwright, Sammamish, WA (US); Jacques Gollier, Sammamish, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 158 days.

(21) Appl. No.: 16/780,731

(22) Filed: Feb. 3, 2020

Related U.S. Application Data

(60) Provisional application No. 62/804,141, filed on Feb. 11, 2019.

(51) Int. Cl.
*G02B 3/08* (2006.01)
*G02B 3/10* (2006.01)

(52) U.S. Cl.
CPC ..................................... *G02B 3/10* (2013.01)

(58) Field of Classification Search
CPC ... G02B 3/00; G02B 3/10; G02B 3/08; G02B 5/09; G02B 27/017; G02B 27/0172
See application file for complete search history.

(56) References Cited

U.S. PATENT DOCUMENTS

2017/0336539 A1* 11/2017 Perreault .................. G02B 3/08

* cited by examiner

*Primary Examiner* — Joseph P Martinez
(74) *Attorney, Agent, or Firm* — Morgan, Lewis & Bockius LLP

(57) ABSTRACT

A lens assembly includes a first lens and a second lens. The first lens has a first lens surface and a second lens surface opposite to the first lens surface. The second lens surface includes a first plurality of Fresnel structures. The second lens, coupled to the first lens, has a third lens surface and a fourth lens surface opposite to the third lens surface. The third lens surface includes a second plurality of Fresnel structures. The third lens surface faces the first lens and the second lens surface faces the second lens. A headset that includes a display and the lens assembly is also disclosed. A method of transmitting, with the lens assembly, light from the display toward an image plane is also disclosed.

20 Claims, 21 Drawing Sheets

# SHADOW-MATCHED FRESNEL LENS DOUBLET FOR REDUCED OPTICAL ARTIFACTS

RELATED APPLICATION

This application claims the benefit of, and priority to, U.S. Provisional Patent Application Ser. No. 62/804,141, filed Feb. 11, 2019, which is incorporated by reference herein in its entirety.

TECHNICAL FIELD

This relates generally to optical lenses, and more specifically to optical lenses used in head-mounted display devices.

BACKGROUND

Head-mounted display devices (also called herein head-mounted displays) are gaining popularity as means for providing visual information to user. However, the size and weight of conventional head-mounted displays have limited applications of head-mounted displays.

SUMMARY

Accordingly, there is a need for head-mounted displays that are compact and light, thereby enhancing the user's virtual-reality and/or augmented reality experience.

It is desirable for head-mounted displays to provide a wide field of view in order to deliver a fully immersive experience to a user. Fresnel lenses are typically thinner and lighter than conventional lenses of similar performance features (e.g., aperture and/or focal length) and can provide apertures and focal lengths comparable to conventional lenses. Thus, replacing conventional lenses in head-mounted displays with Fresnel lenses can reduce the size and weight of the head-mounted displays. A lens assembly such as a Fresnel lens doublet (e.g., two Fresnel lenses) may be used to further increase the field of view of a head-mounted display. However, Fresnel lenses suffer from diffraction and other optical artifacts associated with Fresnel structures that may be exacerbated by the use of multiple Fresnel lens.

Thus, there is a need for compact and light optics that provide a wide field of view while reducing optical artifacts.

The above deficiencies and other problems associated with conventional lenses are reduced or eliminated by the disclosed lenses. In some embodiments, the lenses are included in a display device. In some embodiments, the device is a head-mounted display device. In some embodiments, the device is portable.

In accordance with some embodiments, a lens assembly includes a first lens and a second lens. The first lens has a first lens surface and a second lens surface opposite to the first lens surface. The second lens surface includes a first plurality of Fresnel structures. The second lens, coupled to the first lens, has a third lens surface and a fourth lens surface opposite to the third lens surface. The third lens surface includes a second plurality of Fresnel structures. The third lens surface faces the first lens and the second lens surface faces the second lens.

In accordance with some embodiments, a headset comprises a display and a lens assembly. The lens assembly includes a first lens and a second lens configured to project light from the display to an image plane. The first lens has a first lens surface and a second lens surface opposite to the first lens surface. The second lens surface includes a first plurality of Fresnel structures. A respective Fresnel structure of the first plurality of Fresnel structures has a draft facet, characterized by a draft angle, and a slope facet. The second lens is coupled with the first lens so that at least a portion of light transmitted through the first lens is transmitted through the second lens. The second lens has a third lens surface and a fourth lens surface opposite to the third lens surface. The third lens surface includes a second plurality of Fresnel structures. A respective Fresnel structure of the second plurality of Fresnel structures has a slope facet and a draft facet. A respective ray of the light projected from a respective location of the display to the image plane passes through a respective slope facet of the first plurality of Fresnel structures and a respective slope facet of the second plurality of Fresnel structures.

In accordance with some embodiments, a method of transmitting, with a lens assembly, light from a display toward an image plane is disclosed. The lens assembly includes a first lens and a second lens. The first lens has a first lens surface and a second lens surface opposite to the first lens surface. The second lens surface includes a first plurality of Fresnel structures. A respective Fresnel structure of the first plurality of Fresnel structures has a draft facet, characterized by a draft angle, and a slope facet. The second lens, coupled to the first lens, has a third lens surface and a fourth lens surface opposite to the third lens surface. The third lens surface includes a second plurality of Fresnel structures. The third lens surface faces the first lens and the second lens surface faces the second lens. A respective Fresnel structure of the second plurality of Fresnel structures has a slope facet and a draft facet. The method includes transmitting a respective ray from a respective location of the display to the image plane through a respective slope facet of the first plurality of Fresnel structures and a respective slope facet of the second plurality of Fresnel structures.

Thus, the disclosed embodiments provide compact and light weight display devices with increased efficiency, effectiveness, and user satisfaction with such devices.

Embodiments according to the invention are in particular disclosed in the attached claims directed to a lens, a display device and corresponding methods, wherein any feature mentioned in one claim category, e.g. device, can be claimed in another claim category, e.g. in a method or use claim, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

Figure 1:
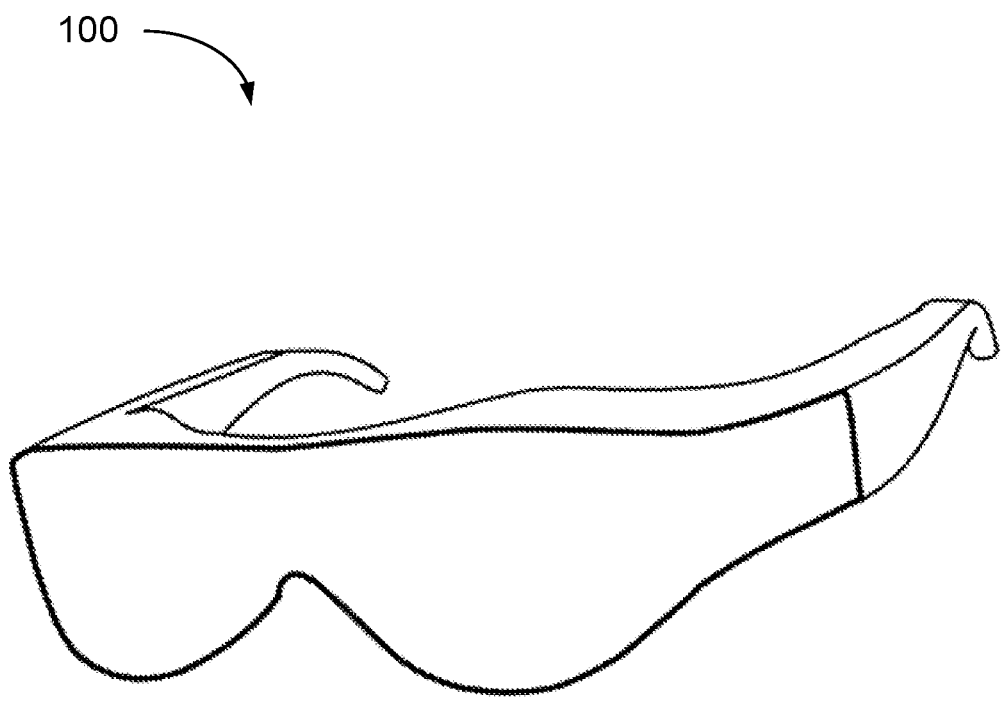
FIG. 1 is a perspective view of a display device in accordance with some embodiments.

These figures are not drawn to scale unless indicated otherwise.

DETAILED DESCRIPTION

Conventional head-mounted displays benefit from having a wide field of view to provide a user with a fully immersive experience. Conventional head-mounted displays are also larger and heavier than typical eyeglasses because conventional head-mounted displays often include a complex set of optics that can be bulky and heavy. It is not easy for users to get used to wearing such large and heavy head-mounted displays.

The disclosed embodiments provide a Fresnel lens doublet configuration that has comparable optical artifacts to a single Fresnel lens. A Fresnel lens doublet that includes one or more of a Fresnel lens with dynamic draft, a Fresnel lens with variable pitch, and a Fresnel lens with dynamic draft and variable pitch is also disclosed.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first surface could be termed a second surface, and, similarly, a second surface could be termed a first surface, without departing from the scope of the various described embodiments. The first surface and the second surface are both surfaces, but they are not the same surfaces.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1 illustrates display device 100 in accordance with some embodiments. In some embodiments, display device 100 is configured to be worn on a head of a user (e.g., by having the form of spectacles or eyeglasses, as shown in FIG. 1) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user).

In some embodiments, display device 100 includes one or more components described below with respect to FIG. 2A. In some embodiments, display device 100 includes additional components not shown in FIG. 2A.

Figure 2A:
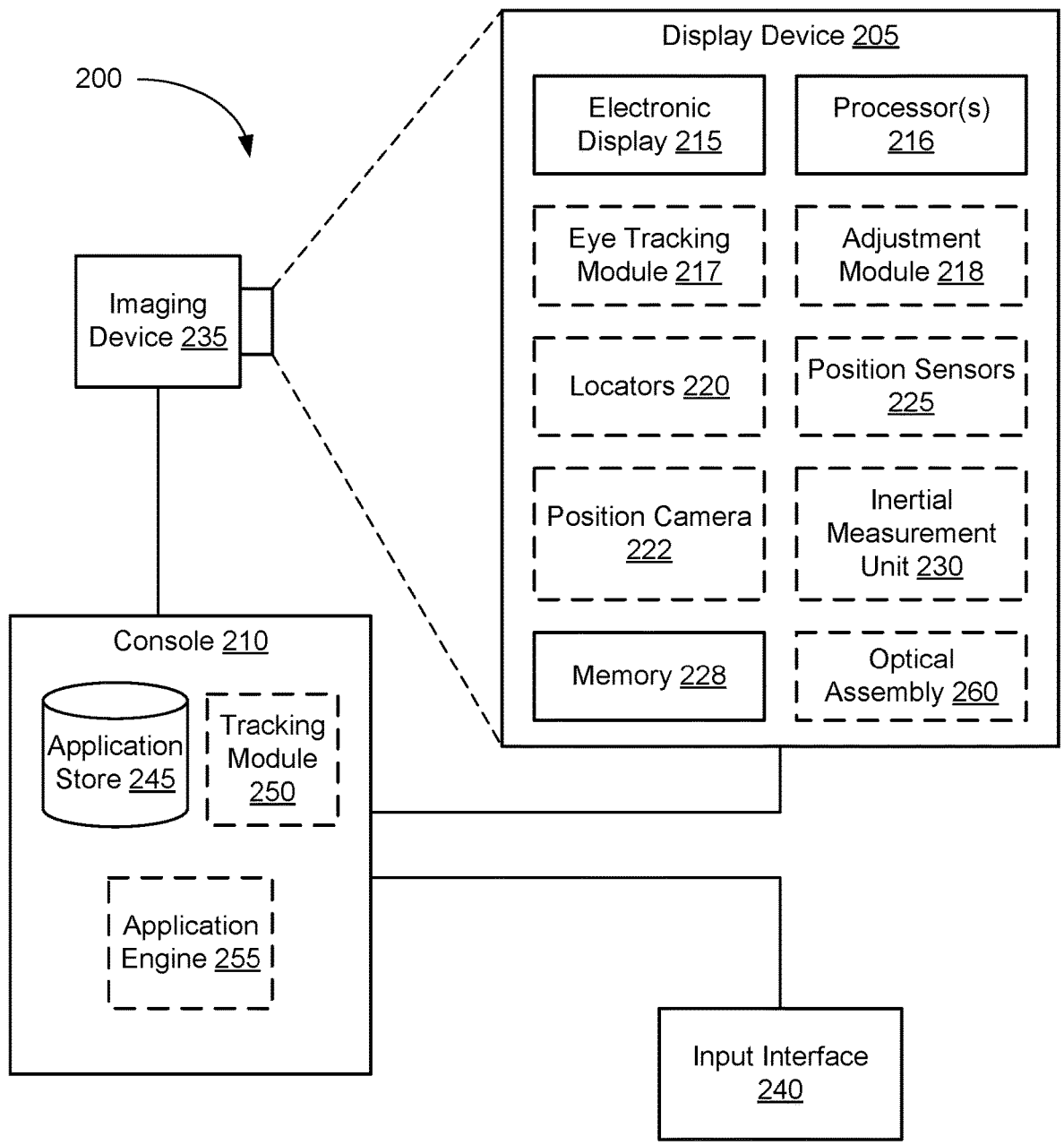
FIG. 2A is a block diagram of a system including a display device in accordance with some embodiments.

FIG. 2A is a block diagram of system 200 in accordance with some embodiments. The system 200 shown in FIG. 2A includes display device 205 (which corresponds to display device 100 shown in FIG. 1), imaging device 235, and input interface 240 that are each coupled to console 210. While FIG. 2A shows an example of system 200 including one display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver virtual reality, mixed reality, and augmented reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in a virtual environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an AR device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable electronic display element or multiple adjustable electronic displays elements (e.g., a display for each eye of a user).

In some embodiments, the display element includes one or more light emission devices and a corresponding array of emission intensity array. An emission intensity array is an array of electro-optic pixels, opto-electronic pixels, some other array of devices that dynamically adjust the amount of light transmitted by each device, or some combination thereof. These pixels are placed behind one or more lenses. In some embodiments, the emission intensity array is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The emission intensity array is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

One or more lenses direct light from the arrays of light emission devices (optionally through the emission intensity arrays) to locations within each eyebox and ultimately to the back of the user's retina(s). An eyebox is a region that is occupied by an eye of a user located proximity to display device 205 (e.g., a user wearing display device 205) for viewing images from display device 205. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described above.

Adjustment module 218 generates an image frame based on the determined locations of the pupils. In some embodiments, this sends a discrete image to the display that will tile subimages together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display to not pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light towards the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2A, console 210 includes application store 245, tracking module 250, and application engine 255. Some embodiments of console 210 have different modules than those described in conjunction with FIG. 2A. Similarly, the functions further described below may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in a virtual environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

Figure 2B:
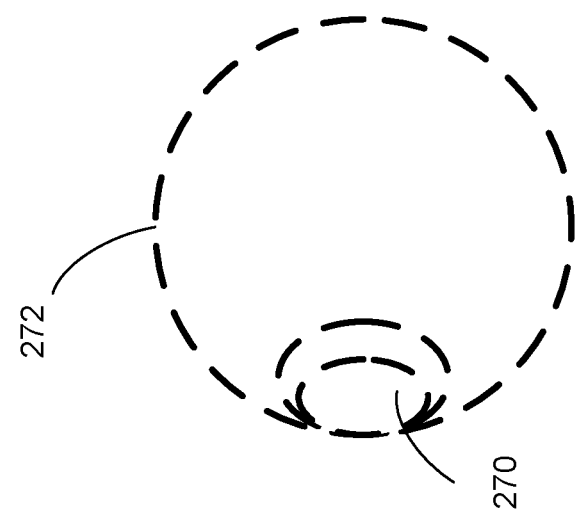
FIG. 2B is an isometric view of a display device in accordance with some embodiments.
Figure 2B:
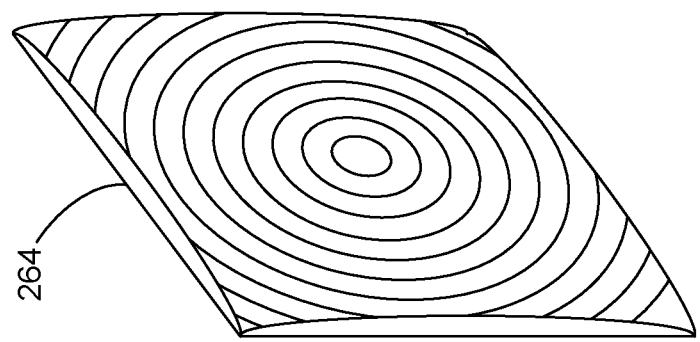
Figure 2B:
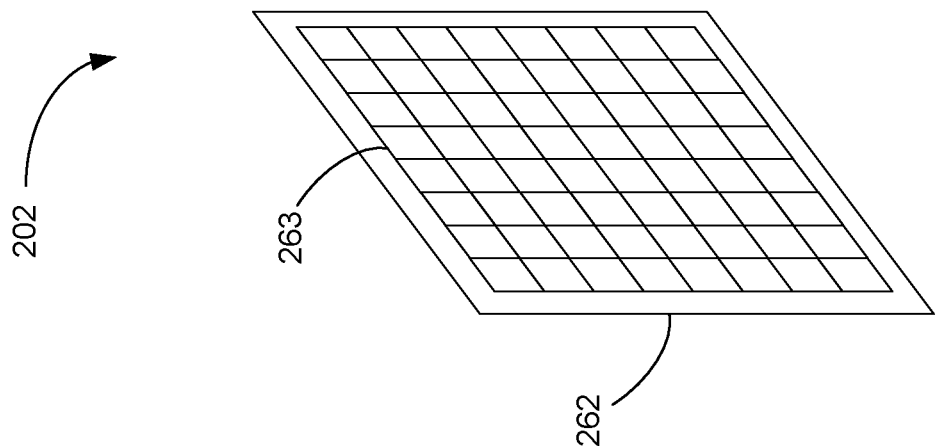

FIG. 2B is an isometric view of display device 202, corresponding to display device 205 in accordance with some embodiments. In some other embodiments, display device 202 is part of some other electronic display (e.g., digital microscope, etc.). In some embodiments, display device 202 includes light emission device array 262 and one or more lenses (e.g., lens 264). In some embodiments, display device 202 also includes an emission intensity array and an IR detector array.

Light emission device array 262 emits image light and optional IR light toward the viewing user. Light emission device array 262 may be, e.g., an array of LEDs, an array of microLEDs, an array of OLEDs, or some combination thereof. Light emission device array 262 includes light emission devices 263 that emit visible light (and optionally includes devices that emit IR light).

The emission intensity array is configured to selectively attenuate light emitted from light emission device array 262. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner the emission intensity array is able to control what portion of the image light emitted from light emission device array 262 is passed to the one or more lenses (e.g., lens 264). In some embodiments, display device 202 uses the emission intensity array to facilitate providing image light to a location of pupil 270 of eye 272 of a user, and minimize the amount of image light provided to other areas in the eyebox.

In FIG. 2B, one or more lenses (e.g., lens 264) is configured to receive the modified image light (e.g., attenuated light) from the emission intensity array (or directly from light emission device array 262), and to direct the modified image light to a location of pupil 270. In some embodiments, lens 264 includes one or more diffractive optics. In some embodiments, lens 264 includes one or more Fresnel lens, described below with respect to FIGS. 3A-3F, and FIGS. 4A-4C. In some embodiments, one or more of the Fresnel lenses illustrated in FIGS. 4A-4C include a Fresnel lens with dynamic draft.

An optional IR detector array detects IR light that has been retro-reflected from the retina of eye 272, a cornea of eye 272, a crystalline lens of eye 272, or some combination thereof. The IR detector array includes either a single IR sensor or a plurality of IR sensitive detectors (e.g., photodiodes). In some embodiments, the IR detector array is separate from light emission device array 262. In some embodiments, the IR detector array is integrated into light emission device array 262.

In some embodiments, light emission device array 262 and the emission intensity array make up a display element. Alternatively, the display element includes light emission device array 262 (e.g., when light emission device array 262 includes individually adjustable pixels) without the emission intensity array. In some embodiments, the display element additionally includes the IR array. In some embodiments, in response to a determined location of pupil 270, the display element adjusts the emitted image light such that the light output by the display element is refracted by one or more lenses (e.g., lens 264) toward the determined location of pupil 270, and not toward other locations in the eyebox.

Figure 3A:
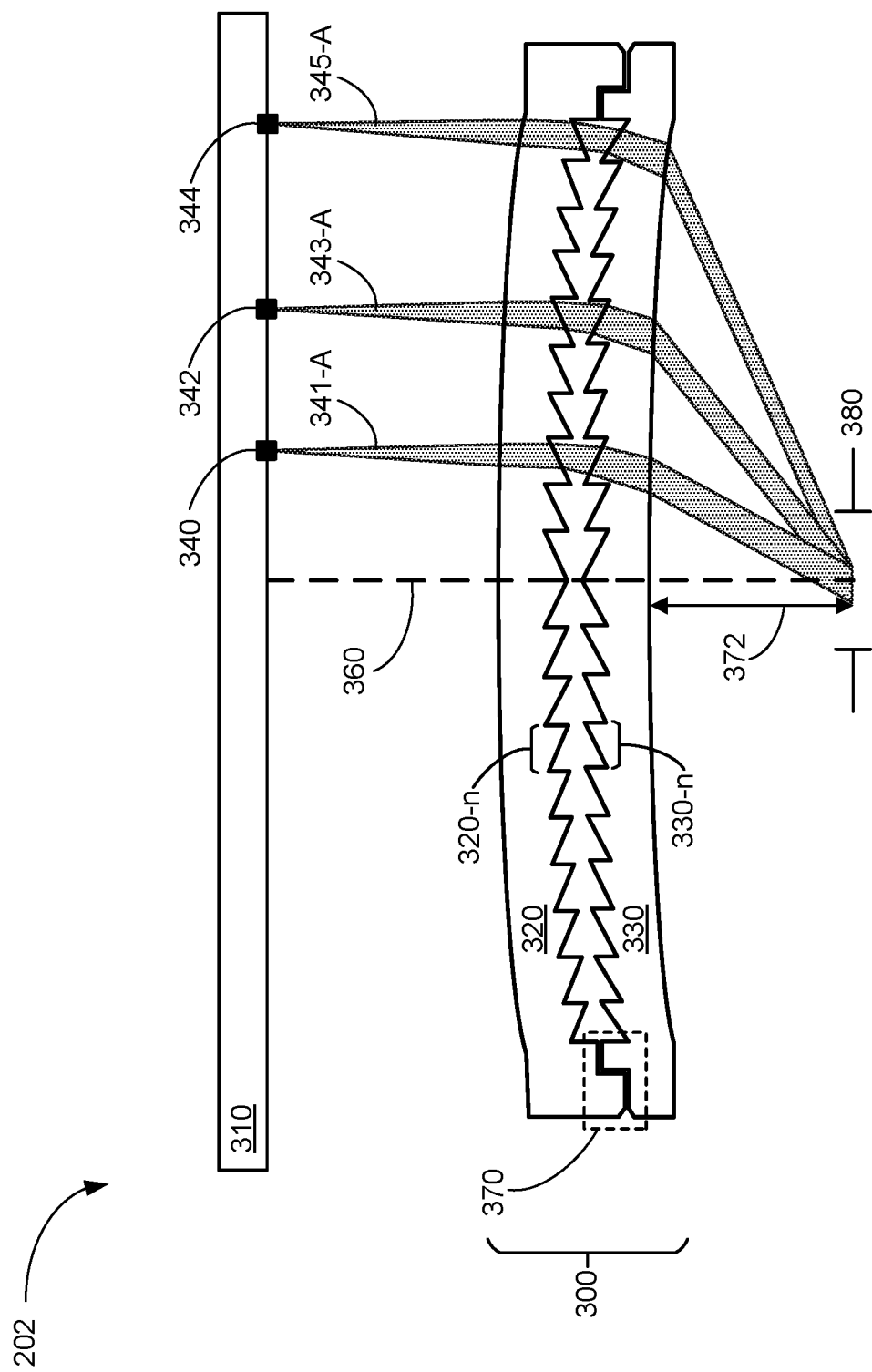
FIG. 3A illustrates a cross-sectional view of a lens assembly in a display device in accordance with some embodiments.

FIG. 3A illustrates a cross-sectional view of display device 202 that includes a display 310 transmitting light through lens assembly 300 toward reference pupil 380 in accordance with some embodiments. Lens assembly 300 is a Fresnel lens doublet and includes a first Fresnel lens 320 and a second Fresnel lens 330 and is configured to provide a wide field of view. In some embodiments, lens assembly 300 can provide a peripheral field of view up to 120° (e.g., for an eye relief distance of 15 mm). The peripheral field of view is defined as the angle subtended between the optical axis and the maximum display field in the periphery (toward the temples). In FIG. 3A, peripheral fields up to −65° are shown.

Figure 3B:
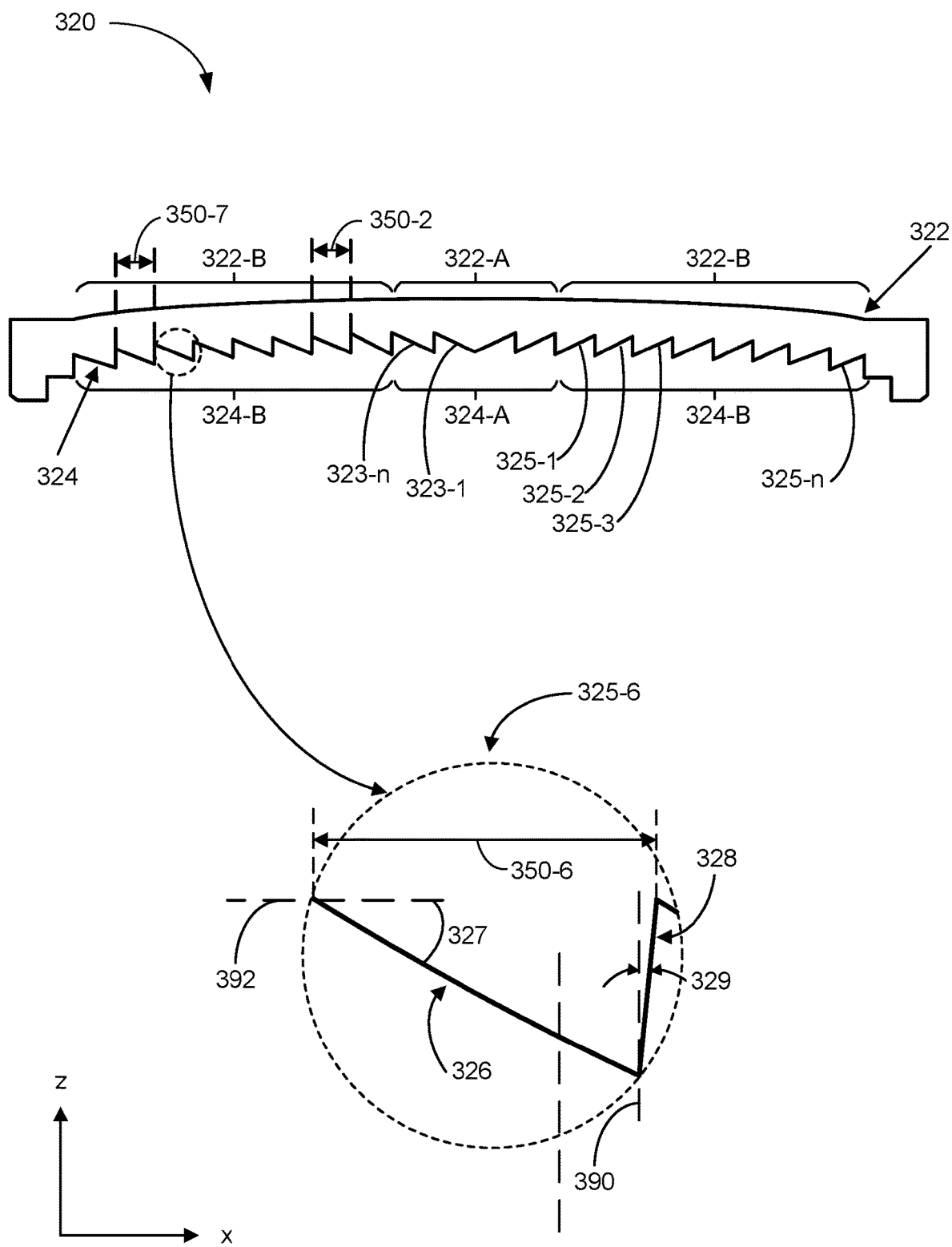
FIGS. 3B-3C shows a cross-sectional view of a Fresnel lens in accordance with some embodiments.

FIG. 3B shows a cross-sectional view of Fresnel lens 320 in accordance with some embodiments. Fresnel lens 320 is an axisymmetric (e.g., rotationally symmetric about a center of the lens) circular lens that has a first surface 322 and a second surface 324 opposite to the first surface 322. First surface 322 of Fresnel lens 320 is a convex surface and second surface 324 of Fresnel lens 320 is a concave surface, making Fresnel lens 320 a convex-concave lens (e.g., meniscus lens). Fresnel lens 320 includes Fresnel structures on second surface 324 (e.g., the concave surface).

First surface 322 of Fresnel lens 320 includes a first portion 322-A (e.g., a central portion) and a second portion 322-B (e.g., an annular portion) around (e.g., surrounding) the first portion 322-A. In some embodiments, at least a portion of first portion 322-A of first surface 322 is configured to receive light corresponding to a 20 degree peripheral field of view or greater. First surface 322, including first portion 322-A and second portion 322-B, is defined by a smooth surface profile (e.g., a surface profile that does not include Fresnel structures, such as a convex surface without Fresnel structures).

Second surface 324 includes a first portion 324-A (e.g., a central portion) and a second portion 324-B (e.g., an annular portion) around (e.g., surrounding) the first portion 324-A. In some embodiments, at least a portion of first portion 324-A of second surface 324 is configured to receive light corresponding to a 20 degree temporal field of view or greater. In some embodiments, as shown, the first portion 324-A of second surface 324 is defined by a Fresnel surface profile that includes a first group of Fresnel structures 323-$n$ (e.g., 323-1, 323-$n$) (e.g., Fresnel structures 323-$n$ arranged on a concave surface), referred to herein individually or collectively as Fresnel structure(s) 323-$n$. As shown in FIG. 3B, Fresnel structure 323-1 extends to the center of the lens, forming a smooth convex structure at the center of Fresnel lens 320 so that the center of the lens is smooth at the optical axis. In some embodiments, not shown, the first portion 324-A of second surface 324 is defined by a smooth surface profile (e.g., a surface profile that does not include Fresnel structures, such as a concave or convex surface without Fresnel structures. Second portion 324-B of second surface 324 is defined by a Fresnel surface profile that includes a second group of Fresnel structures 325-$n$ (e.g., Fresnel structures 325-1, 325-2, 325-3, 325-8) (e.g., Fresnel structures 325-$n$ arranged on a concave surface), referred to herein individually or collectively as Fresnel structure(s) 325-$n$. The Fresnel facets are greatly exaggerated in the figures for illustrative purposes.

The Fresnel structures of Fresnel lens 320, including Fresnel structures 323-$n$ and Fresnel structures 325-$n$, each have a slope facet 326 and a draft facet 328. The draft facet 328 is characterized by a draft angle 329 (e.g., the draft facet 328 is tilted by the draft angle 329 from reference axis 390). In some embodiments, the draft facet 328 is a flat surface. In some embodiments, the draft facet 328 is a curved surface and the draft angle is an average draft angle for the draft facet. In some embodiments, the slope facet 326 is characterized by a slope angle 327 (e.g., the slope facet 326 is tilted by the slope angle 327 from reference axis 392). In some embodiments, the slope facet is a flat surface. In some embodiments, the slope facet is a curved surface and the slope angle is an average slope angle for the slope facet. In some embodiments, Fresnel structures 323-$n$ and Fresnel structures 325-$n$ have a same draft angle.

The Fresnel structures of Fresnel lens 320, including Fresnel structures 323-$n$ and Fresnel structures 325-$n$, each have a pitch. For example, as shown in FIG. 3B, distance 350-7 represents the pitch of Fresnel structure 320-7. In some embodiments, the minimum pitch of a Fresnel structure can be calculated using the following equation:

$$P > (5 \times 10^{-4})/R \quad (1)$$

where P is the minimum pitch of Fresnel structure in millimeters (mm) (e.g., Fresnel structures 323-$n$, 325-$n$) on a Fresnel lens (e.g., lens 320) configured to receive light from a display (e.g., display 310) having a pixel resolution R, defined as the pixel pitch divided by the focal length. Thus, pixel resolution R has a unit of radians. For example, to support 1 arcmin resolution, the minimum pixel pitch is approximately $P=(5\times10^{-4})/(1/60*pi/180)=1.7$ mm.

In some embodiments, the Fresnel structures (e.g., Fresnel structures 323-$n$ and/or 325-$n$) of Fresnel lens 320 have a constant pitch (e.g., 50 μm, 60 μm, 70 μm, 80 μm, 90 μm, 100 μm, 150 μm, 200 μm, 250 μm, 300 μm, 350 μm, 400 μm, 450 μm, 500 μm, 550 μm, 600 μm, 700 μm, 800 μm, 900 μm, 1 mm, 1.1 mm, 1.2 mm, 1.3 mm, 1.4 mm, 1.5 mm, 2 mm, 3 mm, etc.).

In some embodiments, Fresnel structures 323-$n$ on the first portion 324-A of the second surface 324 of Fresnel lens 320 have a pitch that is larger than or equal to the minimum pitch as determined by equation 1. In some embodiments, Fresnel structures 325-$n$ on the second portion 324-B of the second surface 324 of Fresnel lens 320 have a pitch that is larger than or equal to the minimum pitch as determined by equation 1. In some embodiments, Fresnel structures 320-$n$, including Fresnel structures 323-$n$ and Fresnel structures 325-$n$, of Fresnel lens 320 have a pitch that is larger than or equal to the minimum pitch as determined by equation 1.

In some embodiments, as shown in FIG. 3A, when lens 320 is used in a display device (e.g., display device 202), lens 320 is positioned so that first surface 322 faces display 310. In some embodiments, second surface 324 faces an eye of a user or a second lens (e.g., Fresnel lens 330).

Figure 3C:
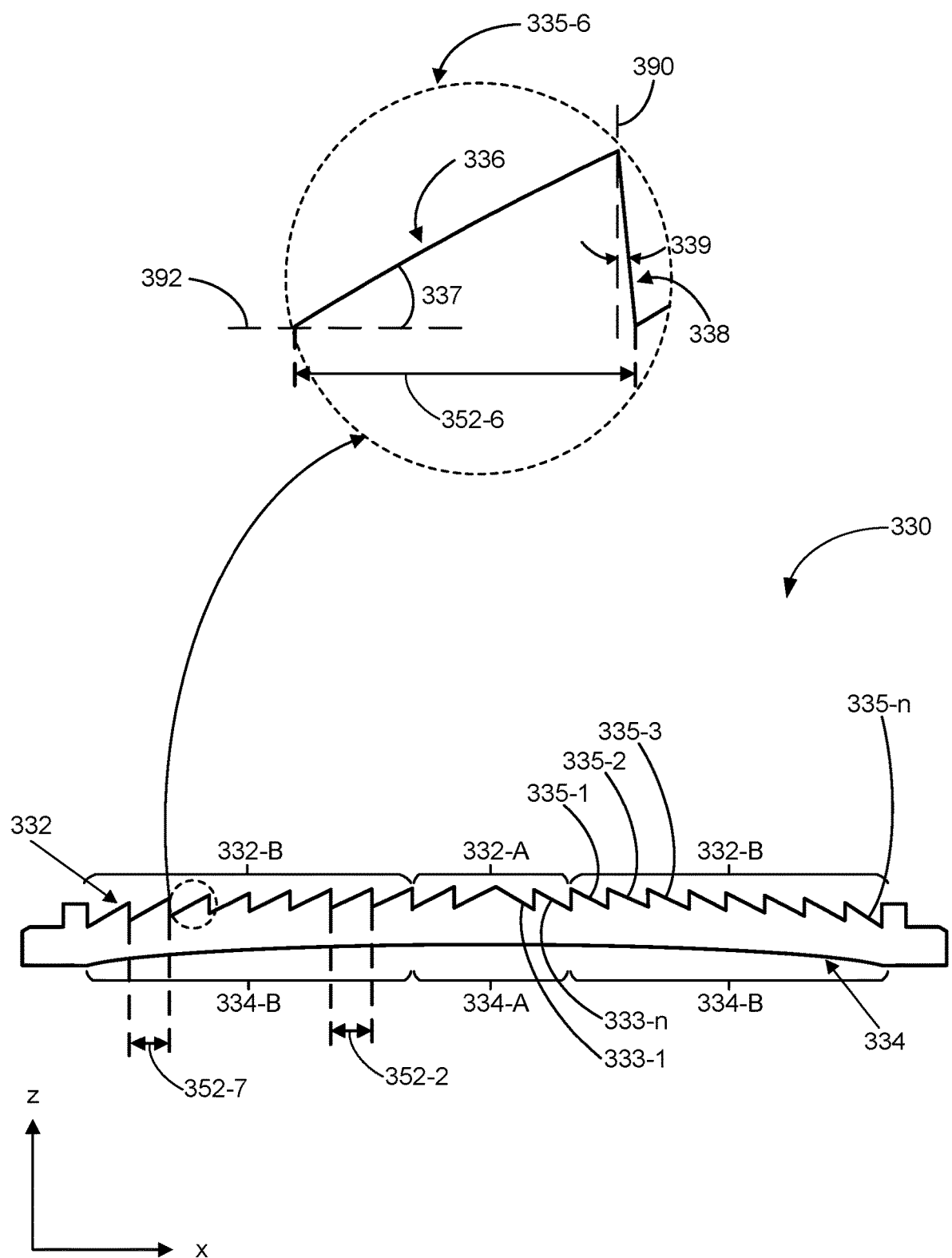

FIG. 3C shows a cross-sectional view of Fresnel lens 330 in accordance with some embodiments. Fresnel lens 330 is an axisymmetric (e.g., rotationally symmetric about a center of the lens) circular lens. Fresnel lens 330 has a first surface 332 and a second surface 334 opposite to the first surface 332. First surface 332 is a convex surface and second surface 334 is a concave surface, making Fresnel lens 330 a convex-concave lens (e.g., meniscus lens). Fresnel lens 330 includes Fresnel structures on first surface 332 (e.g., the convex surface).

First surface 332 includes a first portion 332-A (e.g., a central portion) and a second portion 332-B (e.g., an annular portion) around (e.g., surrounding) the first portion 332-A. In some embodiments, as shown, the first portion 332-A of first surface 332 is defined by a Fresnel surface profile that includes a first group of Fresnel structures 333-$n$ (e.g., 333-1, 333-$n$) (e.g., Fresnel structures arranged on a convex surface), referred to herein individually or collectively as Fresnel structure(s) 333-$n$. In some embodiments, shown in FIG. 3C, Fresnel structure 333-1 extends to the center of the lens, forming a convex structure at the center of Fresnel lens 330. As shown in FIG. 3C, the first portion 332-A of first surface 332 is defined by a smooth surface profile (e.g., a surface profile that does not include Fresnel structures, such as a convex surface without Fresnel structures). Second portion 332-B of first surface 332 is defined by a Fresnel surface profile that includes a second group of Fresnel structures 335-$n$ (e.g., Fresnel structures 335-1, 335-2, 335-3, 335-$n$) (e.g., Fresnel structures arranged on a convex surface), referred to herein individually or collectively as Fresnel structure(s) 335-$n$.

Second surface 334 includes a first portion 334-A (e.g., a central portion) and a second portion 334-B (e.g., an annular portion) around (e.g., surrounding) the first portion 334-A. Second surface 334, including first portion 334-A and second portion 334-B, is defined by a smooth surface profile (e.g., a surface profile that does not include Fresnel structures, such as a concave surface without Fresnel structures).

The Fresnel structures 330-$n$ of Fresnel lens 330, including Fresnel structures 333-$n$ and Fresnel structures 335-$n$ have the same structures and details regarding slope facet, draft facet, and pitch, as the Fresnel structures (e.g., Fresnel structures 323-$n$ and 325-$n$) of Fresnel lens 320. Thus, details of the Fresnel structures are not repeated here for brevity.

In some embodiments, the Fresnel structures (e.g., Fresnel structures 333-$n$ and/or 335-$n$) of Fresnel lens 330 have a constant pitch (e.g., 50 µm, 60 µm, 70 µm, 80 µm, 90 µm, 100 µm, 150 µm, 200 µm, 250 µm, 300 µm, 350 µm, 400 µm, 450 µm, 500 µm, 550 µm, 600 µm, 700 µm, 800 µm, 900 µm, 1 mm, 1.1 mm, 1.2 mm, 1.3 mm, 1.4 mm, 1.5 mm, 2 mm, 3 mm, etc.).

In some embodiments, Fresnel structures 333-$n$ on the first portion 332-A of the first surface 334 of Fresnel lens 330 have a pitch that is larger than or equal to the minimum pitch as determined by equation 1. In some embodiments, Fresnel structures 335-$n$ on the second portion 332-B of the first surface 322 of Fresnel lens 330 have a pitch that is larger than or equal to the minimum pitch as determined by equation 1. In some embodiments, Fresnel structures 330-$n$, including Fresnel structures 333-$n$ and Fresnel structures 335-$n$, of Fresnel lens 330 have a pitch that is larger than or equal to the minimum pitch as determined by equation 1.

In some embodiments, as shown in FIG. 3A, when lens 330 is used in a display device (e.g., display device 202), lens 330 is positioned so that first surface 332 faces display 310 or another Fresnel lens (e.g., Fresnel lens 320) and second surface 334 faces an eye of a user when the eye of the user is placed adjacent to the display device.

Figure 3D:
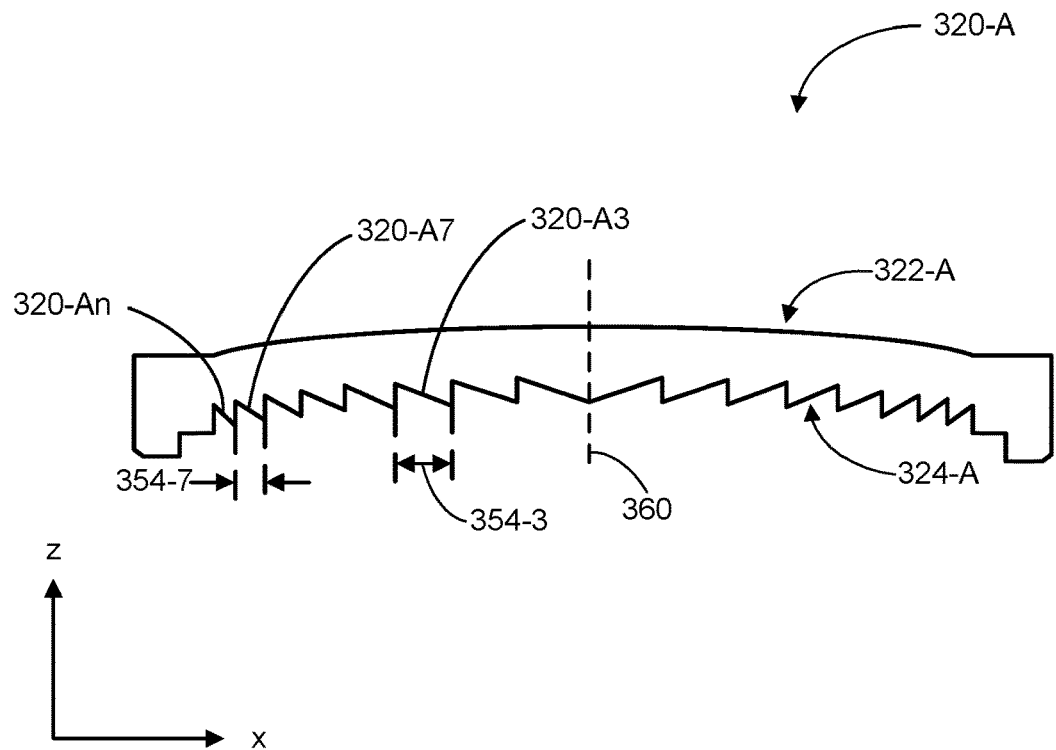
FIGS. 3D-3E illustrate a cross-section of a Fresnel lens with variable pitch.

Referring to FIG. 3D, Fresnel lens 320-A having variable pitch is shown. In some embodiments, Fresnel structures 320-A$n$ (e.g., 320-A3 and 320-A7) of Fresnel lens 320-A have a variable pitch (e.g., a Fresnel structure has a pitch that differs from a pitch of another Fresnel structure of the same lens). In such cases, a pitch of a respective Fresnel structure is based on a distance of the respective Fresnel structure from an optical axis (e.g., a central axis or an axis of symmetry) of the lens. For example, in Fresnel lens 320-A, which has a variable pitch configuration, Fresnel structure 320-A3 is located closer to optical axis 360 than Fresnel structure 320-A7. Thus, Fresnel structure 320-A3 has a larger pitch than Fresnel structure 320-A7 (e.g., distance 354-3 is larger than distance 354-7). Decreasing the pitch of Fresnel structures toward an outside edge of a Fresnel lens reduces visibility of ring patterns (e.g., shadows due to draft facet of the Fresnel structures), thereby improving uniformity and quality of a projected image. Thus, in some embodiments, it may be desirable to have a Fresnel lens that has Fresnel structures with variable pitch. In some embodiments, at least a portion of Fresnel structures 320-A$n$ of Fresnel lens 320-A have a pitch that is larger than or equal to the minimum pitch as determined by equation 1.

Figure 3E:
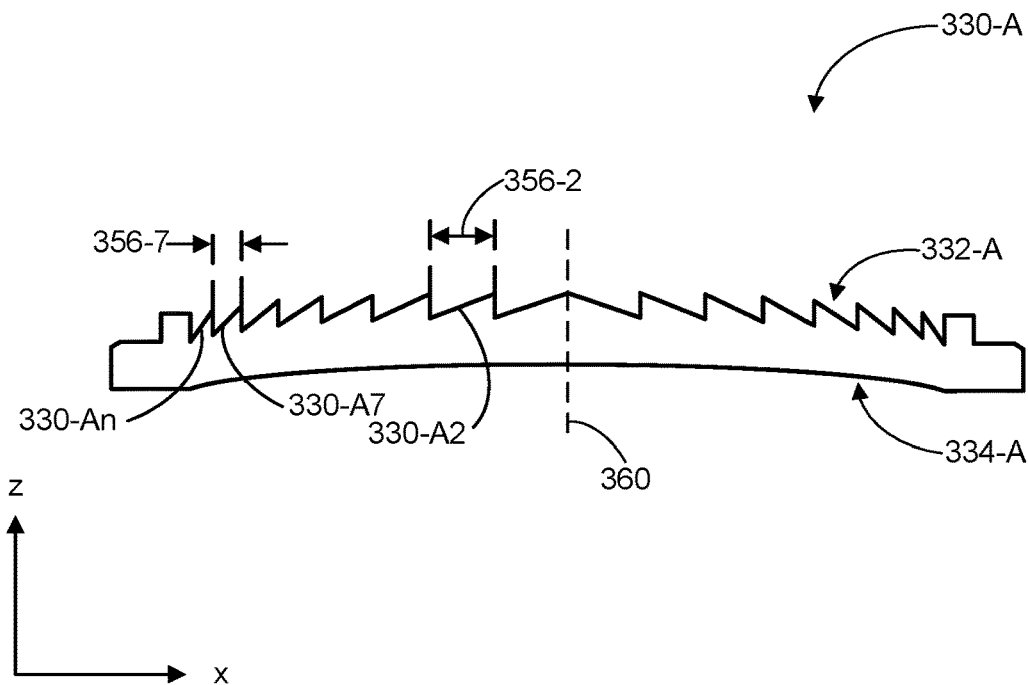

Referring to FIG. 3E, Fresnel lens 330-A having variable pitch is shown. In some embodiments, Fresnel structures 330-A$n$ (e.g., Fresnel structures 330-A2 and 330-A7) of Fresnel lens 330-A have a variable pitch. For example, in a variable pitch configuration, Fresnel structure 330-A2 is located closer to optical axis 360 than Fresnel structure 330-A7. Thus, Fresnel structure 330-A2 has a larger pitch than Fresnel structure 330-A7 (e.g., distance 356-2 is larger than distance 356-7). In some embodiments, at least a portion of Fresnel structures 330-A$n$ (e.g., 330-A2, 330-A7) of Fresnel lens 330-A have a pitch that is larger than or equal to the minimum pitch as determined by equation 1.

As described above, lens 320 and 330 include Fresnel structures on only one of the two lens surfaces. This reduces optical artifacts for light transmitted through lens 320 and 330 compared to light transmitted through a lens having Fresnel structures on both lens surfaces. Thus, a user viewing an image through lens 320 and/or lens 330 is less likely to perceive optical artifacts.

Referring to display device 202 in FIG. 3A, display 310 and reference pupil 380 are located on opposite sides of lens assembly 300. Display 310 faces first surface 322 of Fresnel lens 320 and the second surface 334 of Fresnel lens 330 faces reference pupil 380. The second surface 324 of Fresnel lens 320 faces Fresnel lens 330 (e.g., the second surface 324 of Fresnel lens 320 faces the first surface 332 of Fresnel lens 330) and the first surface 332 of Fresnel lens 330 faces Fresnel lens 320 (e.g., the first surface 332 of Fresnel lens 330 faces the second surface 324 of Fresnel lens 320). In some embodiments, Fresnel lens 320 and Fresnel lens 330 share an optical axis 360 (e.g., a central axis, an axis of symmetry). In some embodiments, optical axis 360 is also a center axis of display 310 (e.g., display 260 is centered about optical axis 360). In some embodiments, the display is decentered (e.g., positioned off-centered with respect to axis 360) toward the temples such that the field of view is larger in the periphery than in the nasal direction.

Display 310 is configured to emit light towards the lens assembly 300. For example, ray 341-A is emitted from off-axis position 340, ray 343-A is emitted from off-axis position 342, and ray 345-A is emitted from off-axis position 344.

Fresnel lens 320 includes a plurality of Fresnel structures 320-$n$ on second surface 324, including Fresnel structures 323-$n$ and 325-$n$ (shown in FIG. 3B). Fresnel lens 330 includes a plurality of Fresnel structures 330-$n$, including Fresnel structures 333-$n$ and 335-$n$ (shown in FIG. 3C). When Fresnel lens 320 and Fresnel lens 330 are arranged in a Fresnel lens doublet configuration (e.g., lens assembly 300), as shown in FIG. 3A, a Fresnel structure 320-$n$ on Fresnel lens 320 has a corresponding Fresnel structure 330-$n$ on Fresnel lens 330 such that light transmitted through a slope facet 326-$n$ of a respective Fresnel structure 320-$n$ of Fresnel lens 320 is received at a slope facet 336-$n$ of a corresponding Fresnel structure 330-$n$ of Fresnel lens 330. For example, Fresnel structure 320-10 transmits ray 345-B as ray 345-C through slope facet 326-10 of Fresnel lens 320. Ray 345-C is incident upon and transmitted through slope facet 336-10 of Fresnel structure 330-10 of Fresnel lens 330. In this example, Fresnel structure 320-10 of Fresnel lens 320 corresponds to (e.g., forms a pair with) Fresnel structure 330-10 of Fresnel lens 330. In some embodiments, Fresnel lens 320 and Fresnel lens 330 are slidingly coupled (e.g., slidably coupled) to one another through coupling structure 370 to align Fresnel lens 320 and Fresnel lens 330 with one another such that a Fresnel structure 320-$n$ of Fresnel lens 320 is aligned with a corresponding Fresnel structure 330-$n$ of Fresnel lens 330 as described above. For example, coupling structure 370 aligns Fresnel lens 320 and Fresnel lens 330 such that Fresnel structure 320-10 of Fresnel lens 320 and Fresnel structure 330-10 of Fresnel lens 330 are aligned with and correspond to (e.g., forms a pair) with one another.

In some embodiments, Fresnel structures 320-n of Fresnel lens have a pitch that corresponds to (e.g., is the same as) Fresnel structures 330-n of Fresnel lens 330. In some embodiments, a respective Fresnel structures 320-n of Fresnel lens has a pitch that corresponds to (e.g., is the same as) a corresponding Fresnel structure 330-n of Fresnel lens 330. For example, when Fresnel lens 320-A and Fresnel lens 330-A are arranged to form a Fresnel lens doublet, Fresnel structure 320-A7 of Fresnel lens 320-A, shown in FIG. 3D, corresponds to and has the same pitch as Fresnel structure 330-A7 of Fresnel lens 330-A, shown in FIG. 3E (e.g., distance 354-A7 is the same as distance 356-A7).

Eye relief distance 372 refers to a distance between reference pupil 380 and lens assembly 300 (e.g., a distance between reference pupil 380 and second surface 334 of Fresnel lens 330). In some embodiments, lens assembly 300 is configured for a predefined eye relief distance of about 5 mm or more (e.g., about 5 mm, 10 mm, 15 mm, 20 mm, 25 mm, or more).

In some embodiments, reference pupil 380 has a diameter ranging from about 1 mm to about 12 mm (e.g., about 1, 2, 3, 4, 5, 6, 7, 8, 9, 10, 11 or about 12 mm). In some embodiments, the diameter of reference pupil 380 ranges from about 2 to about 8 mm. In some embodiments, reference pupil 380 corresponds to pupil 270 of eye 272 of a user, as described with respect to FIG. 2B. In some embodiments, reference pupil 380 refers to a region that is used for designing Fresnel lens 320 and Fresnel lens 330 of the Fresnel lens doublet.

Figure 3F:
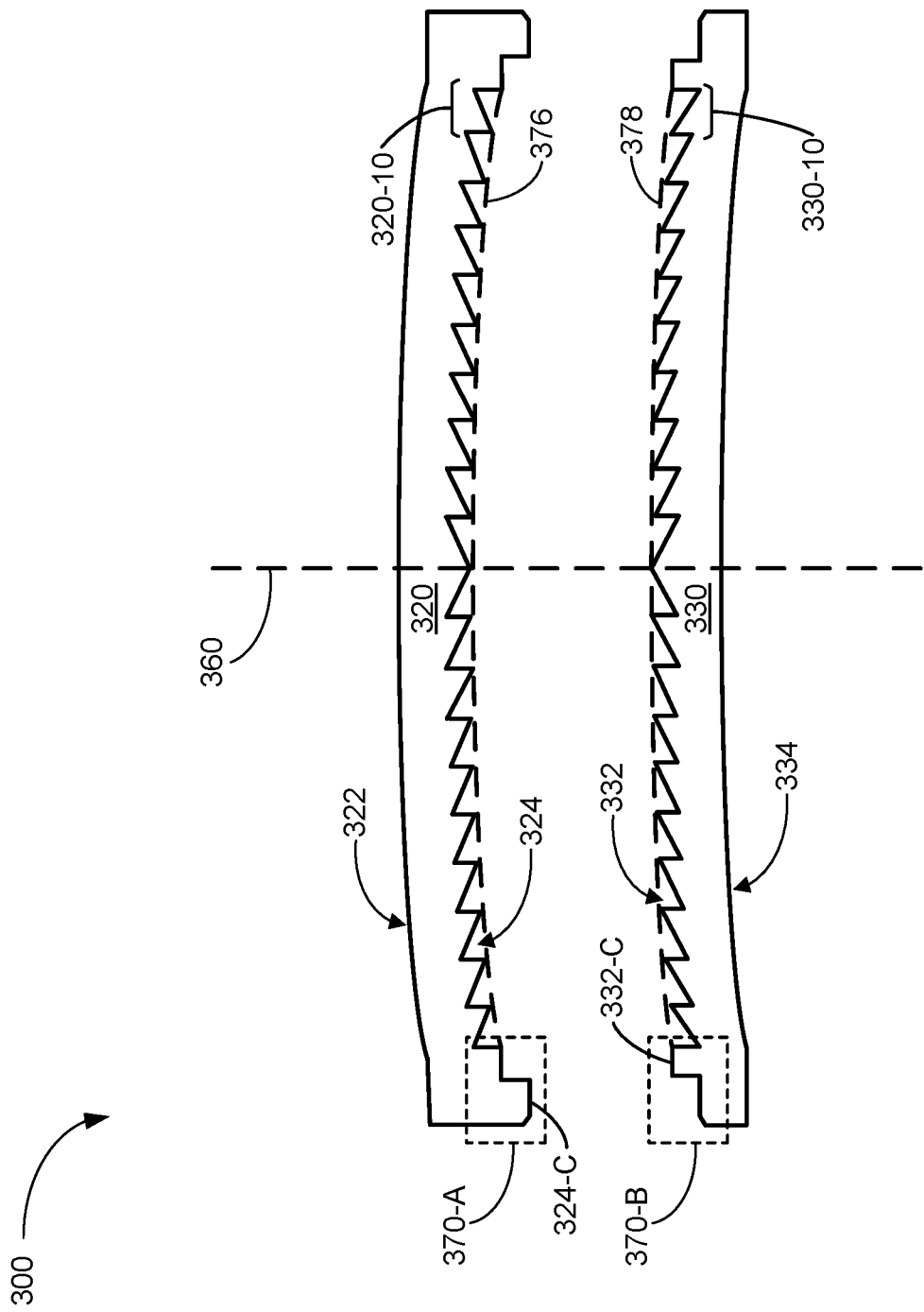
FIG. 3F illustrates a cross-section view of a lens assembly in accordance with some embodiments.

FIG. 3F shows a cross-sectional view of lens assembly 300 in accordance with some embodiments. Fresnel lens 320 and Fresnel lens 330 of lens assembly 300 are shown separated for ease of illustration.

Dashed line 376 shows the concave outline of second surface 324 of Fresnel lens 320 that Fresnel structures 320-n follow. Dashed line 378 shows the convex outline of first surface 332 of Fresnel lens 330 that Fresnel structures 330-n follow. When Fresnel lens 320 and Fresnel lens 330 are arranged (e.g., coupled) as lens assembly 300, the second surface 324 of Fresnel lens 320 and the first surface 332 of Fresnel lens 330 are separated by a distance 374 (e.g., distance 374 is the distance between outlines 376 and 378). In some embodiments, the second surface 324 of Fresnel lens 320 and the first surface 332 of Fresnel lens 330 are separated by an air gap corresponding to distance 374. In some embodiments, distance 374 is constant. In some embodiments, distance 374 is a predetermined distance. In some embodiments, distance 374 is much less than 1 millimeter. For example, distance 374 may be less than any of 500 micrometers, 400 micrometers, 300 micrometers, 200 micrometers, or 100 micrometers.

Fresnel lens 320 and Fresnel lens 330 are optionally slidingly coupled to one another through an optional coupling structure 370 (shown in FIG. 3A) such that a Fresnel structure 320-n of Fresnel lens 320 is aligned with a corresponding Fresnel structure 330-n of Fresnel lens 330. For example, when Fresnel lens 320 and Fresnel lens 330 are coupled by coupling structure 370, Fresnel structure 320-10 of Fresnel lens 320 and Fresnel structure 330-10 of Fresnel lens 330 are aligned with and correspond to (e.g., forms a pair) with one another so that light transmitted through the slope facet of Fresnel structure 320-10 is incident on the slope facet of Fresnel structure 330-10.

Optional coupling structure 370, shown in FIGS. 3A and 3F, includes a first portion 370-A, located as part of Fresnel lens 320 and a second portion 370-B, located as part of Fresnel lens 330. First portion 370-A includes a portion 324-C of the second surface 324 of Fresnel lens 320. Second portion 370-B includes a portion 332-C of the first surface 332 of Fresnel lens 330. First portion 370-A and second portion 370-B of coupling structure 370 are slidingly coupled to one another in order to align Fresnel lens 320 and Fresnel lens 330. In other words, lens assembly 300 is formed by coupling (e.g., adjoining, brining into contact) portion 324-C of second surface 324 of Fresnel lens 320 and portion 332-C of first surface 332 of Fresnel lens 330.

In some embodiments, when Fresnel lens 320 and Fresnel lens 330 are coupled to one another to form lens assembly 300, light transmitted through lens assembly 300 is degraded by diffraction through the first Fresnel surface, but the effect of additional diffraction by the second Fresnel surface is reduced. This is due to the registration of the slope facets of the first Fresnel surface to the slope facets of the second Fresnel surface. This way, the light transmitted through lens assembly 300 has a diffraction that is equal to or no greater than light that is transmitted through a single Fresnel surface (e.g., either Fresnel lens 320 or Fresnel lens 330 but not both). In some embodiments, coupling Fresnel lens 320 and Fresnel lens 330 allows Fresnel lens 320 and Fresnel lens 330 to be arranged such that light transmitted through Fresnel lens 330 after passing through Fresnel lens 320 has the same diffraction as light that is transmitted through one of Fresnel lens 320 or Fresnel lens 330 without being transmitted through the other lens. In some embodiments, coupling Fresnel lens 320 and Fresnel lens 330 allows Fresnel lens 320 and Fresnel lens 330 to be arranged such that light transmitted through Fresnel lens 330 after passing through Fresnel lens 320 has diffraction that is no greater than light that is transmitted through one of Fresnel lens 320 or Fresnel lens 330 without being transmitted through the other lens.

Figure 3G:
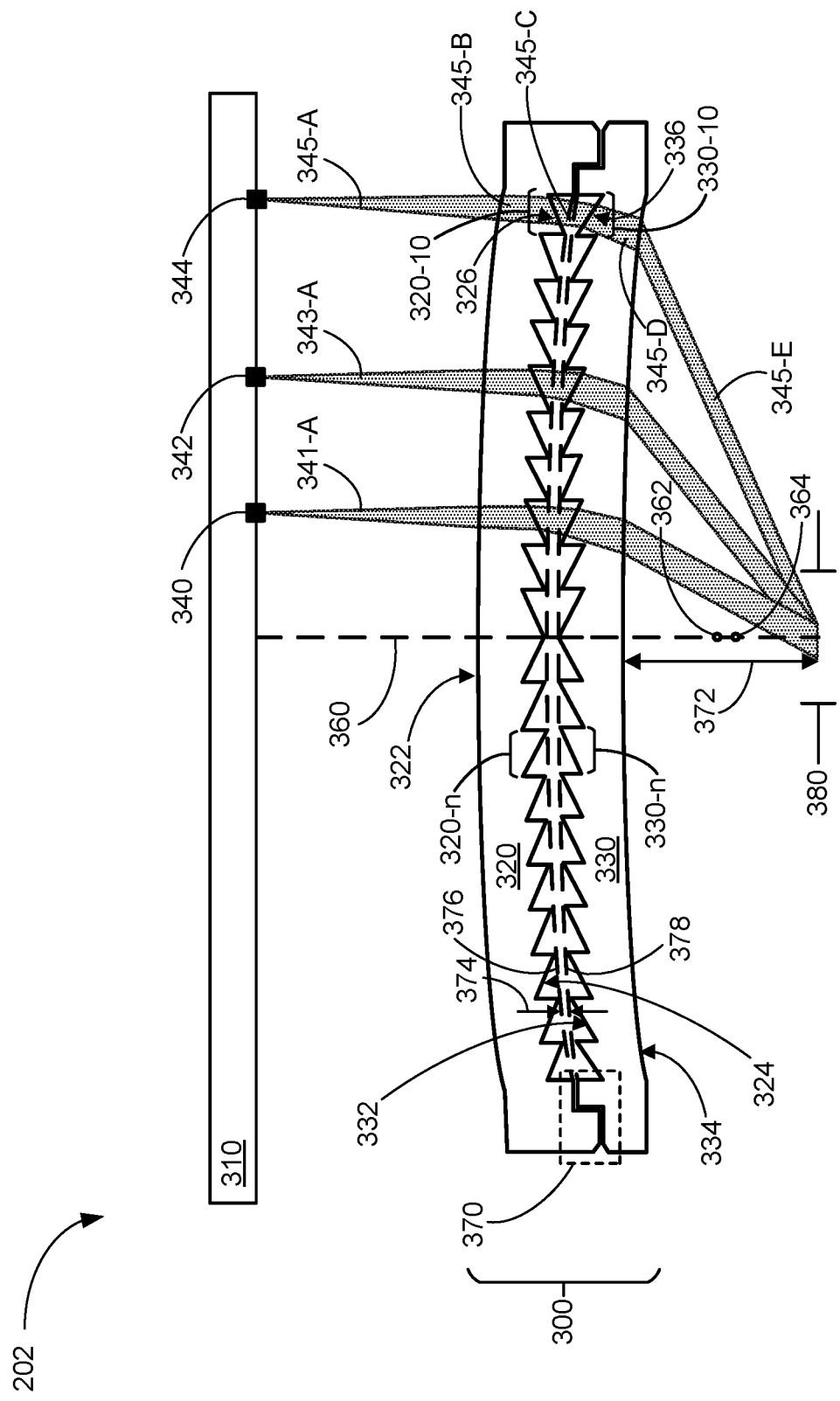
FIG. 3G illustrates a cross-section view of a lens assembly in accordance with some embodiments.

Referring to FIG. 3G, when Fresnel lens 320 and Fresnel lens 330 are arranged (e.g., coupled) as lens assembly 300, the second surface 324 of Fresnel lens 320 and the first surface 332 of Fresnel lens 330 are separated by a distance 374. Dashed line 376 shows the concave outline of second surface 324 of Fresnel lens 320 that Fresnel structures 320-n follow. Dashed line 376 shows that second surface 324 of Fresnel lens 320 has a first meniscus shape (e.g., baseline). The first meniscus shape has a first center of curvature 362 that is located adjacent to (e.g. on the same side as) the second surface 324 of Fresnel lens 320. In some embodiments, the first center of curvature 362 is along optical axis 360. Dashed line 378 shows the convex outline of first surface 332 of Fresnel lens 330 that Fresnel structures 330-n follow. Dashed line 378 shows that first surface 332 of Fresnel lens 330 has a second meniscus shape. The second meniscus shape has a second center of curvature 364 that is located adjacent to (e.g. on the same side as) the second surface 334 of Fresnel lens 330. In some embodiments, the second center of curvature 364 is along optical axis 360. In some embodiments, distance 374 is the distance between outlines 376 and 378. In some embodiments, the second surface 324 of Fresnel lens 320 and the first surface 332 of Fresnel lens 330 are separated by an air gap corresponding to distance 374. In some embodiments, the size of distance 374 is determined based on the shape (e.g., geometry, dimension) of coupling structure 370, including first portion 310-A and second portion 370-B of coupling structure 370. In some embodiments, distance 374 is constant. In some embodiments, distance 374 is a predetermined distance. In some embodiments, distance 374 is less than 1 millimeter.

Display 310 is configured to emit light towards the lens assembly 300. For example, ray 341-A is emitted from off-axis position 340, ray 343-A is emitted from off-axis position 342, and ray 345-A is emitted from off-axis position 344. Following the optical path of ray 345-A, ray 345-A impinges upon first surface 322 of Fresnel lens 320 and propagates through Fresnel lens 320 as ray 345-B. Ray 345-B impinges upon a slope facet 326 of a Fresnel structure 320-n located on the second surface 324 of Fresnel lens 320. In this example, as shown in FIG. 3G, ray 345-B is transmitted through slope facet 326 of Fresnel structure 320-10. Ray 345-B exits Fresnel lens 320 through slope facet 326 of Fresnel structure 320-10 as ray 345-C. Ray 345-C propagates from the second surface 324 of Fresnel lens 320 and is incident on a slope facet 336 of a Fresnel structure 330-10 located on the first surface 332 of Fresnel lens 330. In this example, ray 345-C is incident on slope facet 336 of Fresnel structure 330-10, which corresponds to Fresnel structure 320-10 when Fresnel lens 320 and Fresnel lens 330 are arranged as a Fresnel lens doublet, as shown in FIG. 3G. Ray 345-C is transmitted through the slope facet 336 of Fresnel lens 330 as ray 345-D. Ray 345-D exits Fresnel lens 330 through the second surface 334 of Fresnel lens 330 as ray 345-E. Ray 345-E is directed towards reference pupil 380. Rays 341-A and 343-A, shown in FIG. 3G, follow a similar optical path as ray 345-A.

FIG. 4A-4D illustrate a cross-sectional view of light transmitted through lens assembly 300 in accordance with some embodiments. Fresnel lens 320 and Fresnel lens 330 of lens assembly 300 are configured to direct light (e.g., rays 341-A, 343-A, and 345-A) that are emitted from a display (e.g., display 310) toward reference pupil 380.

Figure 4A:
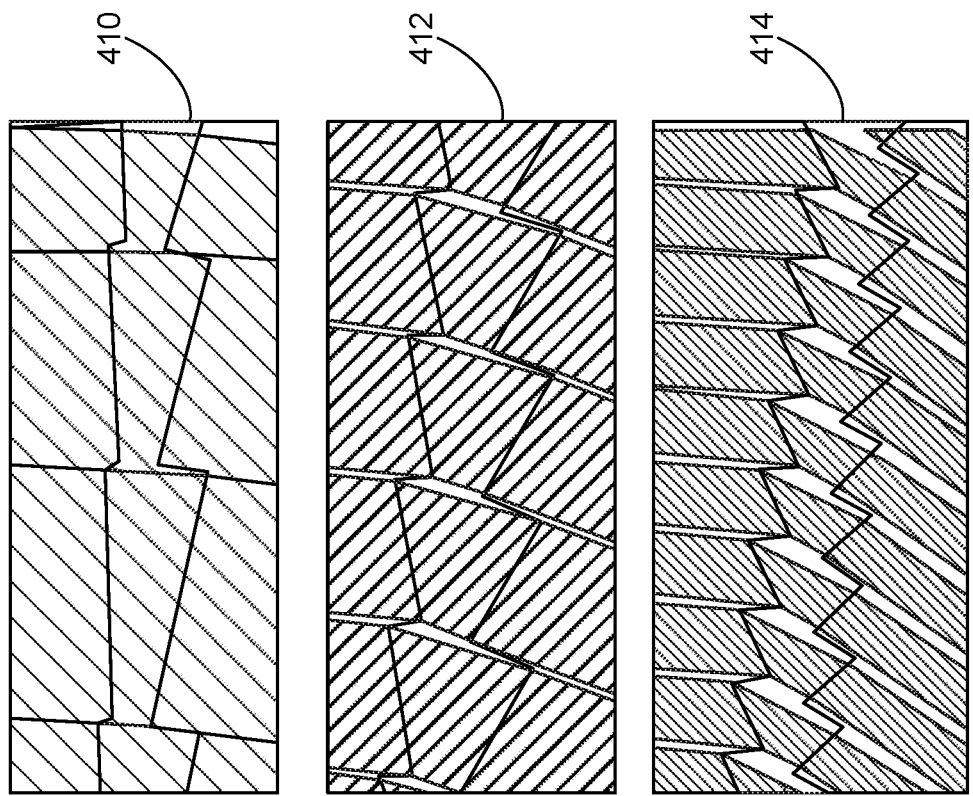
FIGS. 4A-4D illustrate a cross-sectional view of light transmitted through a lens assembly in accordance with some embodiments.
Figure 4A:
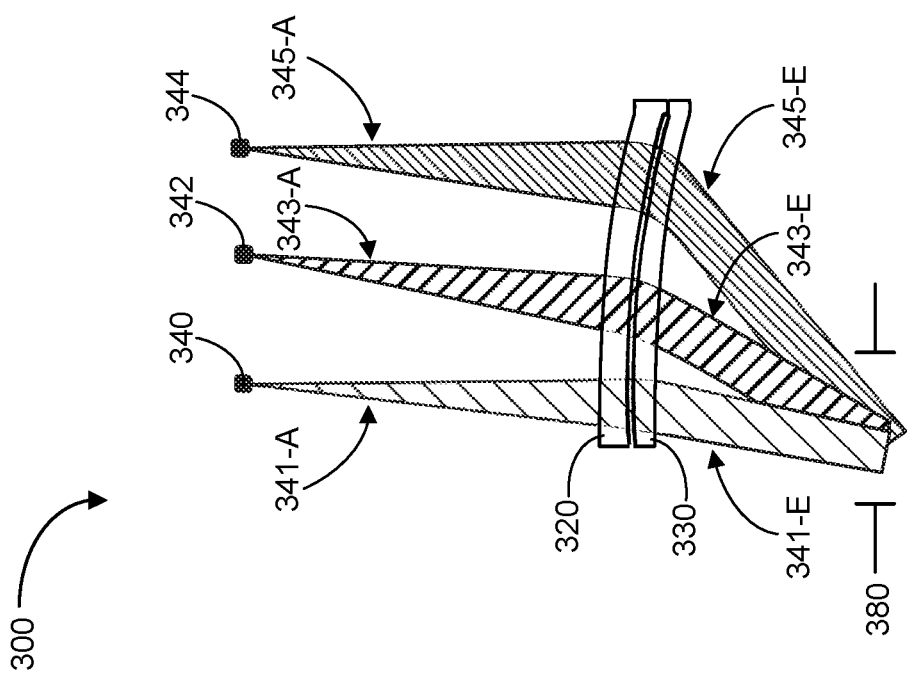
Figure 4B:
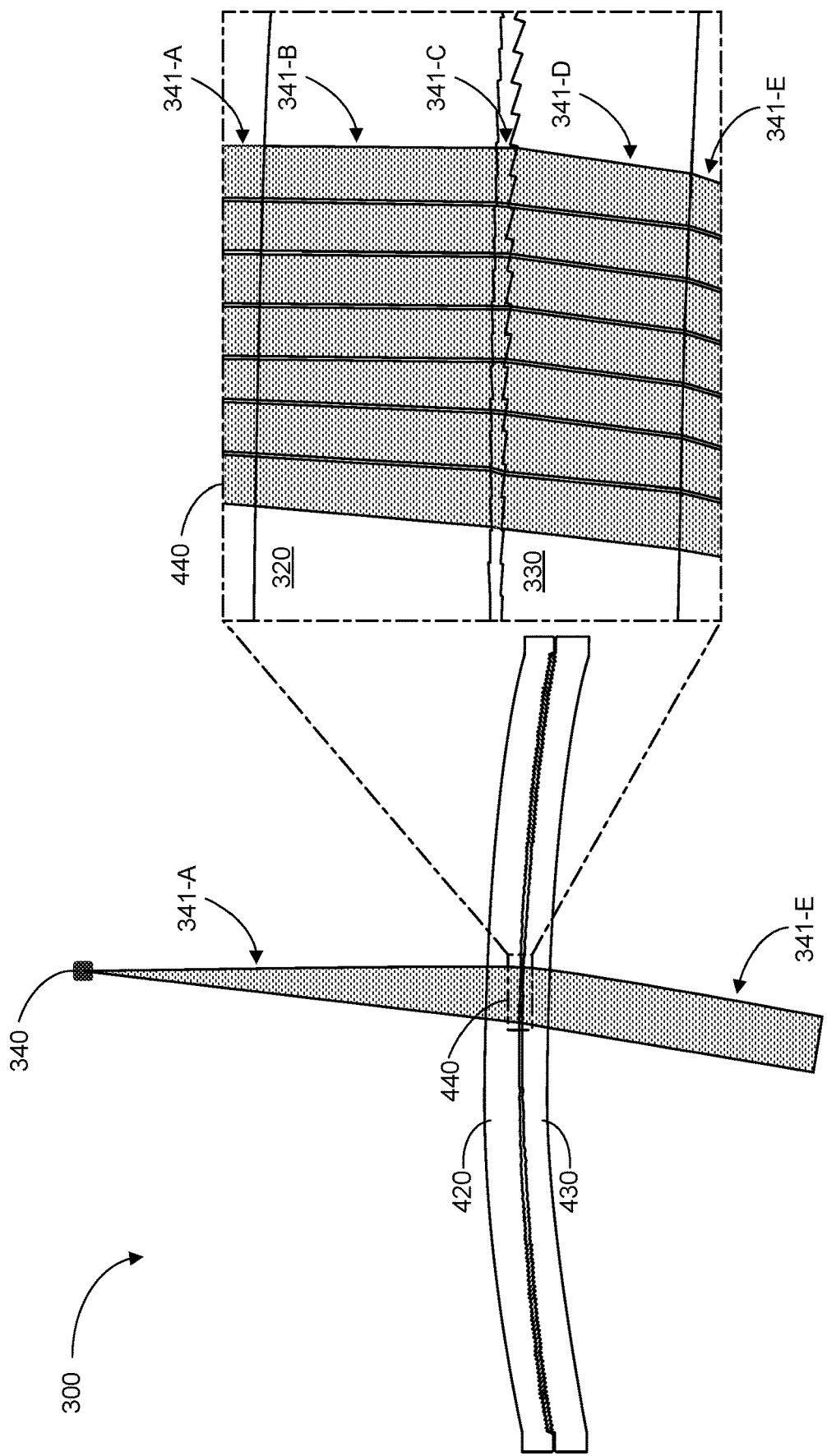

Inset 410, shown in FIG. 4A, and FIG. 4B show zoomed in views of a portion of lens assembly 300 configured to receive light incident on lens assembly 300 at an off-axis position. In some embodiments, the portion of lens assembly 300 shown in inset 410 and FIG. 4B is configured to receive incident light that correspond to a peripheral field of view of 10 degrees. As described above, Fresnel lens 320 and Fresnel lens 330 are arranged so that light (e.g., ray 341-C) transmitted through a respective slope facet of a Fresnel structure 320-n of Fresnel lens 320 impinges upon a slope facet of a corresponding Fresnel structure 330-n of Fresnel lens 330. Referring to inset 440 of FIG. 4B, ray 341-A, emitted from off-axis position 340 of a display (not shown), is incident upon and transmitted through the first surface 322 of Fresnel lens 320 and as ray 341-B. Ray 341-B is incident upon a slope facet of a respective Fresnel structure 320-n, located on the second surface 324 of Fresnel lens 330. Ray 341-B is transmitted through the slope surface of the respective Fresnel structure as ray 341-C. Ray 341-C is incident upon a slope facet of a corresponding Fresnel structure 330-n, located on the first surface 332 of Fresnel lens 330. Ray 341-C is transmitted through the slope facet of the corresponding Fresnel structure as ray 341-D. Ray 341-D is transmitted through the second surface 334 of Fresnel lens 340 as ray 341-E that is directed toward a reference pupil 380. In some embodiments, as shown in inset 410 in FIG. 4A, light that is transmitted through a slope facet of a respective Fresnel structure 320-n of Fresnel lens 320 is transmitted through a slope facet of a corresponding Fresnel structure 330-n of Fresnel lens 330 without impinging on a draft facet of the corresponding Fresnel structure.

Figure 4C:
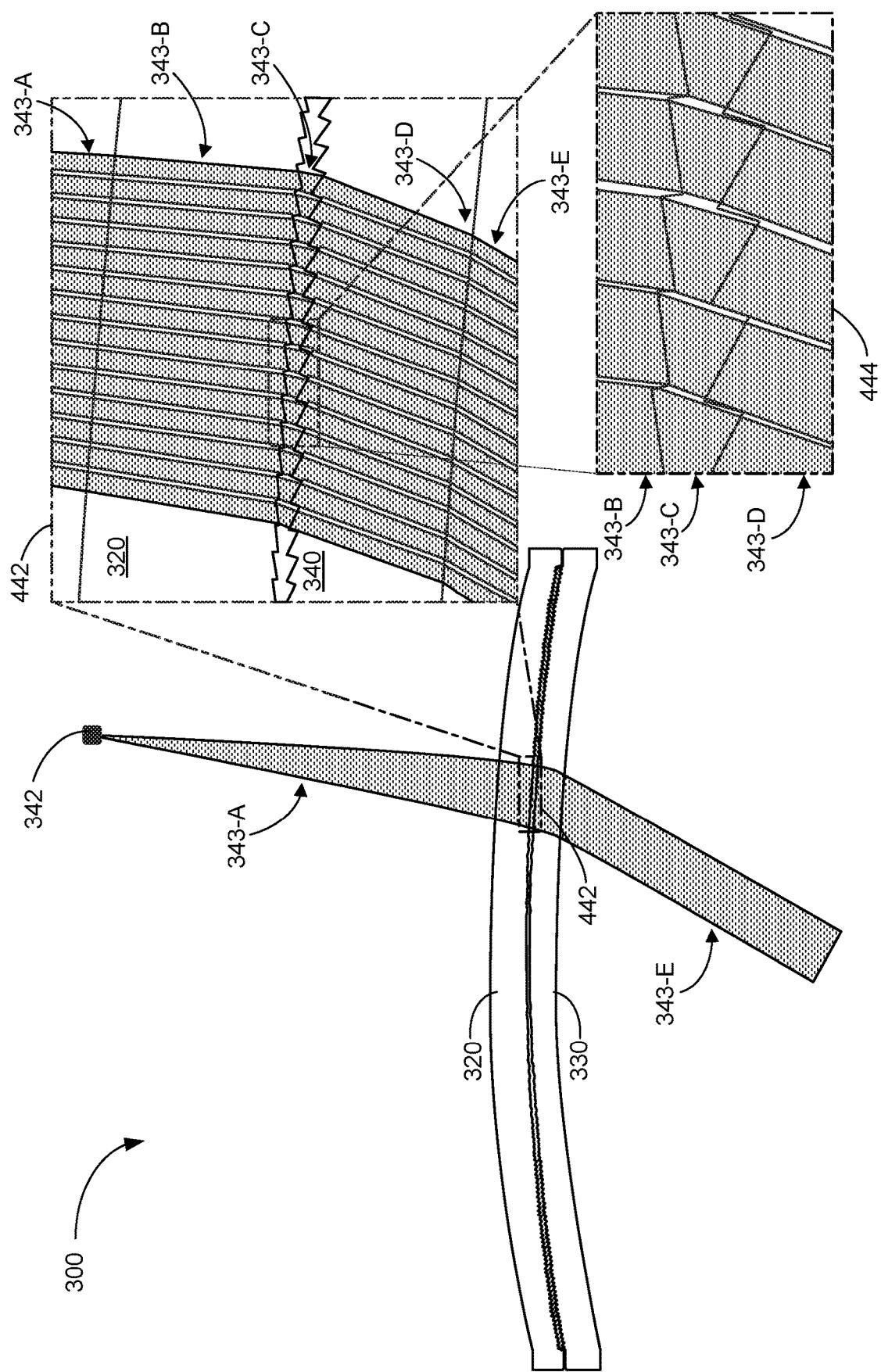

Inset 412, shown in FIG. 4A, and FIG. 4C show zoomed in views of a portion of lens assembly 300 configured to receive light incident on lens assembly 300 at an off-axis position. In some embodiments, the portion of lens assembly 300 shown in inset 412 and FIG. 4C is configured to receive incident light that correspond to a peripheral field of view of 30 degrees. Referring to inset 442 and inset 444 shown in FIG. 4C, rays 343-A to 343-E, originating from off-axis position 342, follow a similar optical path as rays 341-A to 341-E, described above with respect to FIG. 4B. In some embodiments, as shown in inset 412 of FIG. 4A and insets 442 and 444 in FIG. 4C, light that is transmitted through a slope facet of a respective Fresnel structure 320-n of Fresnel lens 320 is transmitted through a slope facet of a corresponding Fresnel structure 330-n of Fresnel lens 330 without impinging on a draft facet of the corresponding Fresnel structure.

Figure 4D:
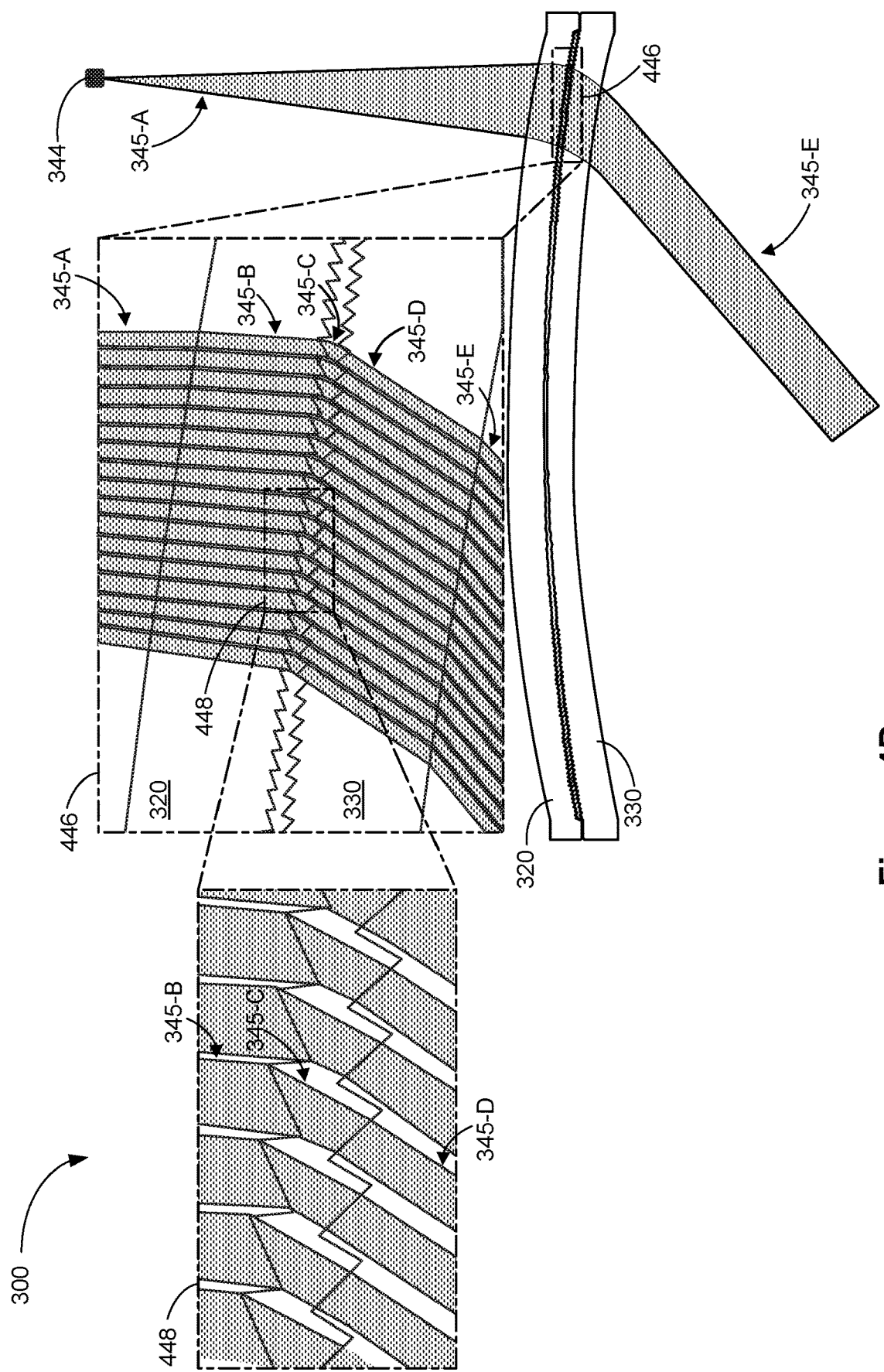

Inset 414, shown in FIG. 4A, and FIG. 4D show zoomed in views of a portion of lens assembly 300 configured to receive light incident on lens assembly 300 at an off-axis position. In some embodiments, the portion of lens assembly 300 shown in inset 414 and FIG. 4D is configured to receive incident light that correspond to a peripheral field of view of 50 degrees. Referring to inset 446 and inset 448 shown in FIG. 4D, rays 345-A to 345-E, originating from off-axis position 344, follow a similar optical path as rays 341-A to 341-E and rays 343-A to 343-E, described above with respect to FIGS. 4B and 4C, respectively. In some embodiments, as shown in inset 414 of FIG. 4A and insets 446 and 448 in FIG. 4D, light that is transmitted through a slope facet of a respective Fresnel structure 320-n of Fresnel lens 320 is transmitted through a slope facet of a corresponding Fresnel structure 330-n of Fresnel lens 330 without impinging on a draft facet of the corresponding Fresnel structure.

Figure 5A:
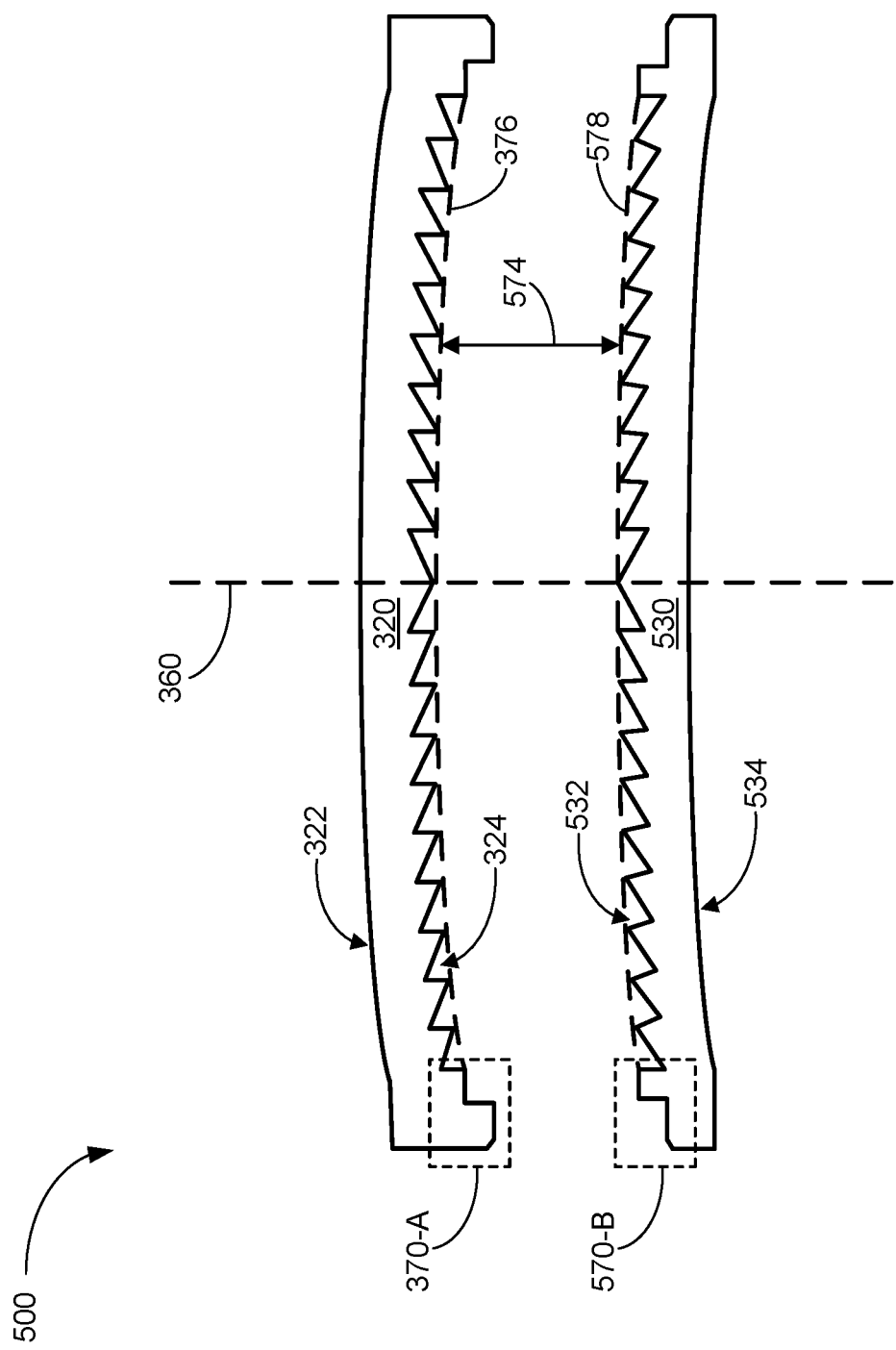
FIG. 5A shows a cross-sectional view of a lens assembly in accordance with some embodiments.

FIG. 5A shows a cross-sectional view of lens assembly 500 in accordance with some embodiments. Lens assembly 500 is a Fresnel lens doublet that includes Fresnel lens 320 and Fresnel lens 530 and is configured to provide a wide field of view. In some embodiments, lens assembly 500 can provide a peripheral field of view up to 120° (e.g., for an eye relief distance of 40 mm). Details regarding Fresnel lens 320 are provided above with respect to FIGS. 3A and 3B and are not repeated here for brevity. Fresnel lens 530 is similar to Fresnel lens 330 with the exception that Fresnel structures 530-n of Fresnel lens 530 have dynamic draft. In some embodiments, when lens 530 is used in a display device (e.g., display device 202), lens 530 is positioned so that first surface 532 faces display 310 or another lens (e.g., Fresnel lens 320) and second surface 534 faces an eye of a user when the eye of the user is placed adjacent to the display device or when the display device is mounted near the user's eyes. Due to the inclusion of Fresnel lens 530, which has dynamic draft, light transmitted through lens assembly 500 has fewer optical artifacts in comparison light transmitted through lens assembly 300. In some embodiments, light transmitted through lens assembly 500 has less diffraction than light transmitted through lens assembly 300. In some embodiments, light transmitted through Fresnel lens 530 has fewer optical artifacts than light transmitted through Fresnel lens 330. In some embodiments, light transmitted through Fresnel lens 530 has less diffraction than light transmitted through Fresnel lens 330.

Fresnel lens 320 and Fresnel lens 530 are optionally slidingly coupled to one another through an optional coupling structure that is analogous to optional coupling structure 370. The optional coupling structure includes a first portion 370-A, described above with respect to FIG. 3F, and a second portion 570-B, analogous to portion 370-B described above with respect to FIG. 3F.

Figure 5B:
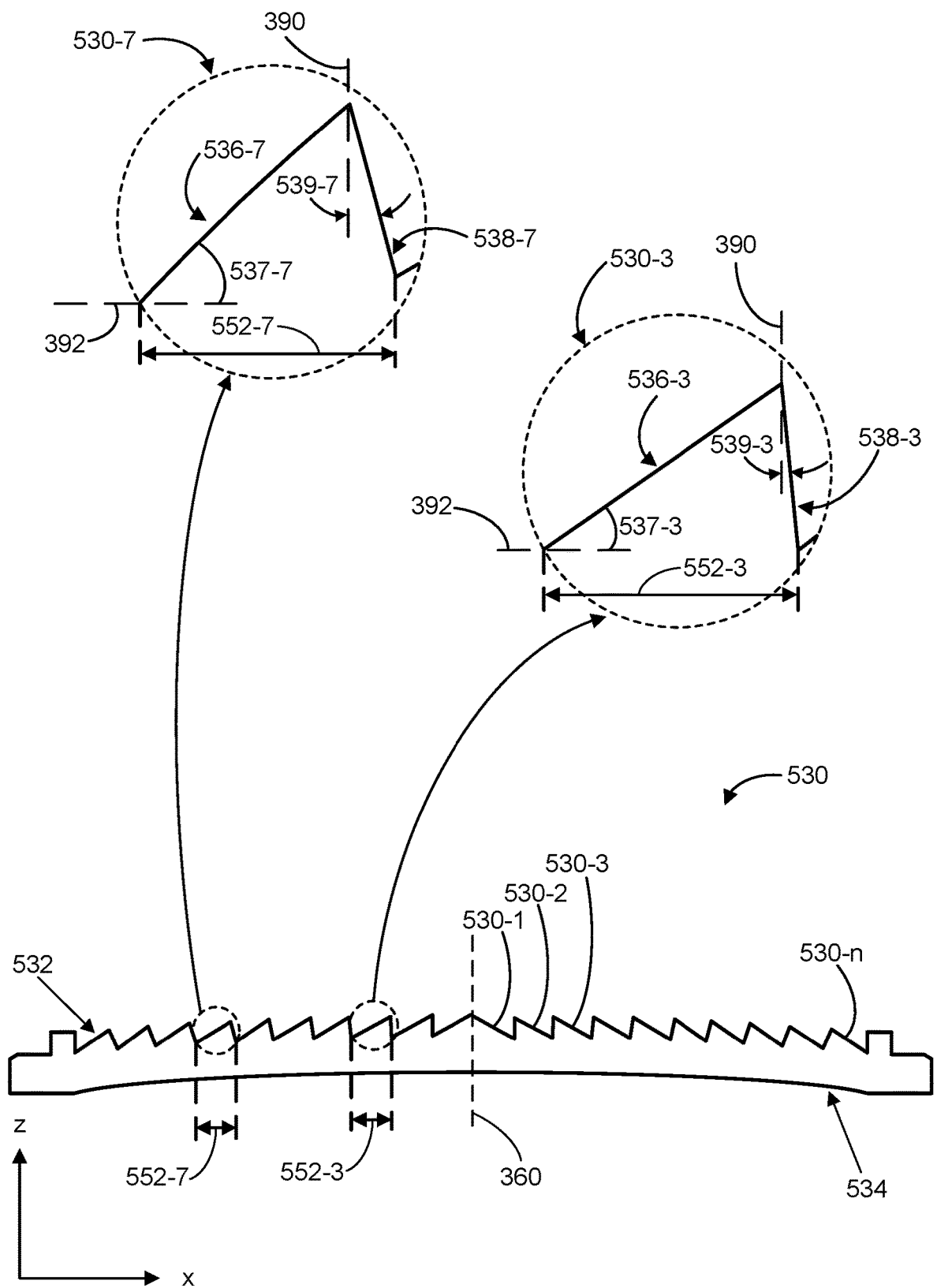
FIG. 5B illustrates a cross-section of a Fresnel lens with dynamic draft.

FIG. 5B illustrates a cross-sectional view of Fresnel lens 530 with dynamic draft in accordance with some embodiments. Fresnel lens 530 is an axisymmetric (e.g., rotationally symmetric about a center of the lens) circular lens. Fresnel lens 530 has a first surface 532 and a second surface 534 opposite to the first surface 532. First surface 532 is a convex surface and second surface 534 is a concave surface. Thus, Fresnel lens 530 is a convex-concave lens (e.g., meniscus lens). First surface 532 of Fresnel lens 530 includes Fresnel structures 530-n that have dynamic draft. In some embodiments, second surface 534 of Fresnel lens 530 has a smooth profile and does not include Fresnel structures.

Figure 5C:
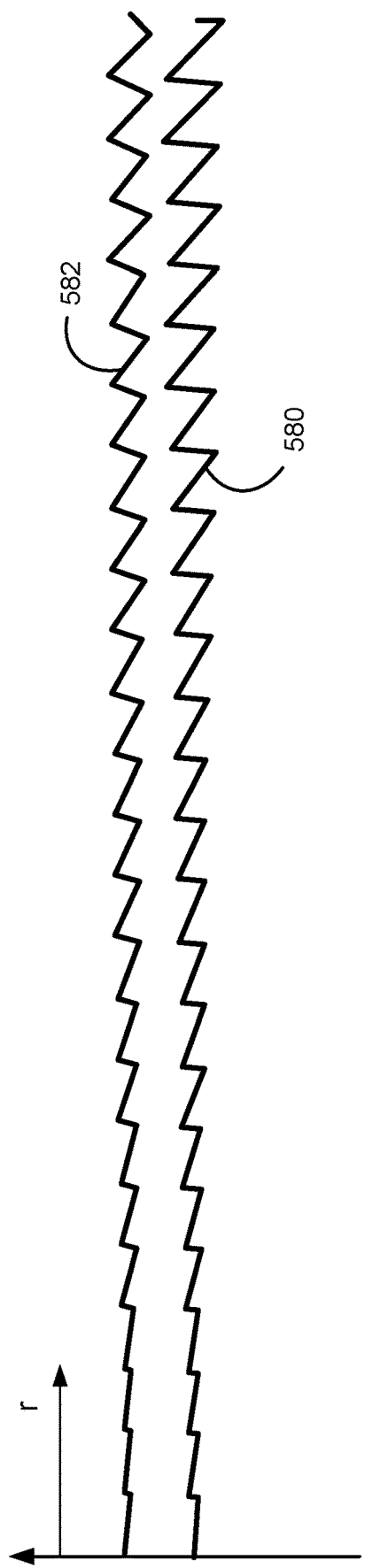
FIG. 5C illustrates surface profiles of a Fresnel lens and a Fresnel lens with dynamic draft in accordance with some embodiments.

FIG. 5C illustrates a surface profile 580 of a conventional Fresnel lens (e.g., Fresnel lens 330) and a surface profile 582 of a Fresnel lens (e.g., Fresnel lens 530) with dynamic draft in accordance with some embodiments. The surface profiles are shown as functions of a distance r from a center of a lens. A conventional Fresnel lens (such as Fresnel lens 320 and 330) has a constant draft angle, independent of a position of each Fresnel structure (e.g., a distance from a center of the lens to the Fresnel structure). A Fresnel lens with dynamic draft has Fresnel structures with different draft angles, where the draft angle for each Fresnel structure is based on a distance from a center of the lens to the Fresnel structure. In FIG. 5C, the draft angle increases (e.g., the draft facet becomes less steep) for Fresnel structures located further away from the center of the lens.

Figure 5D:
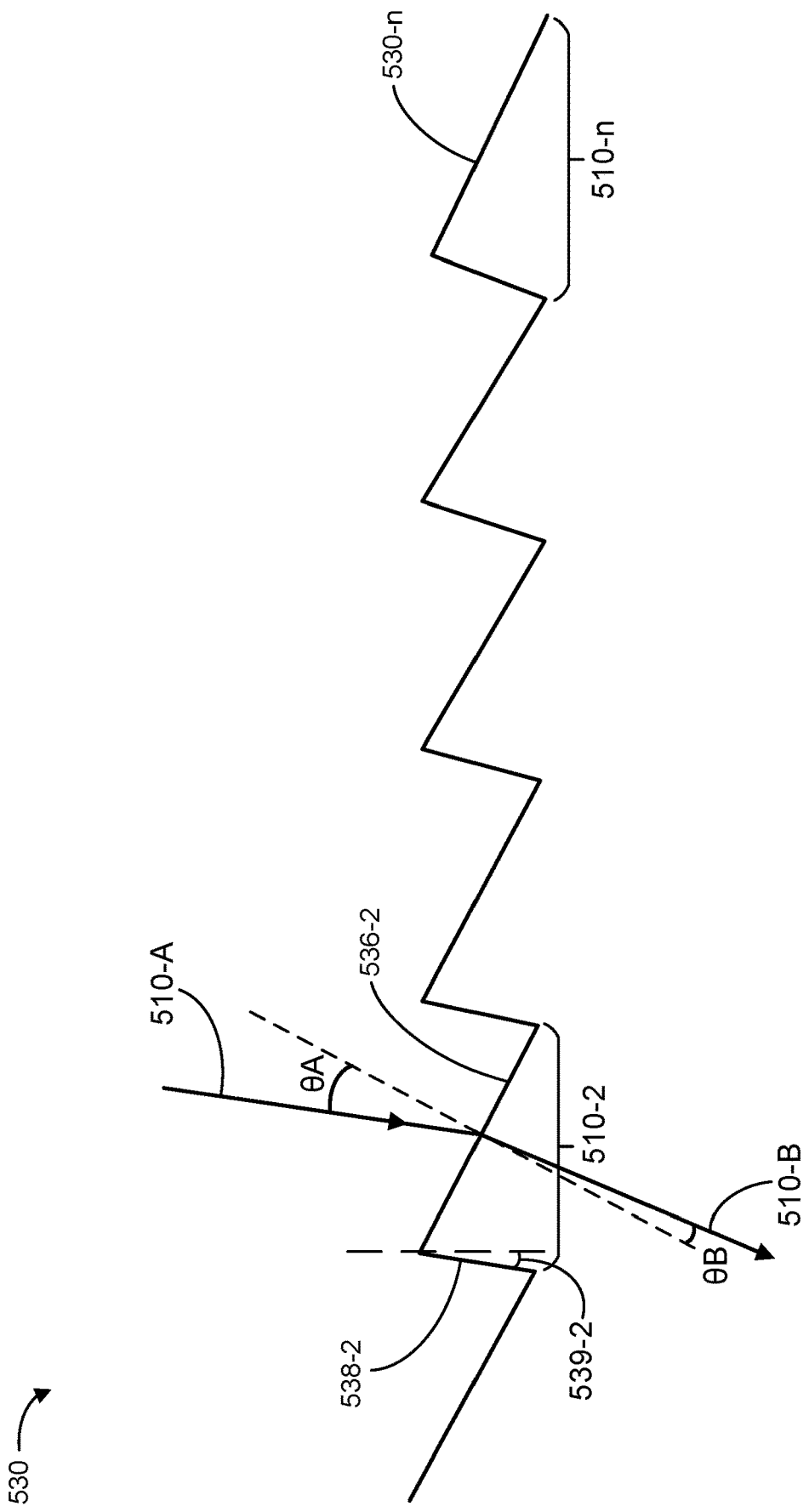
FIG. 5D illustrates reduction in interaction between incoming light and a draft facet in accordance with some embodiments.

Referring to FIG. 5B, the Fresnel structures 530-n of Fresnel lens 530, each have a slope facet 536 and a draft facet 538. The draft facet 528 is characterized by a draft angle 529 (e.g., the draft facet 528 is tilted by the draft angle 539 from reference axis 390). In some embodiments, the slope facet 536 is characterized by a slope angle 537 (e.g., the slope facet 536 is tilted by the slope angle 537 from reference axis 392). In Fresnel lens 530, the draft angle of each Fresnel structure 530-n is based on a distance of the Fresnel structure from a center of the lens. For example, as shown in FIG. 5E, a Fresnel structure located close to the center of the lens (e.g., optical axis 360) has a draft facet that is steeper than a draft facet of a Fresnel structure located away from the center of the lens (e.g., a Fresnel structure located closer to the center of the lens has a smaller draft angle than a draft angle of a Fresnel structure located away from the center of the lens). In FIG. 5B, Fresnel structure 530-7, located further from optical axis 360 than Fresnel structure 530-3, has a draft angle 539-7 that is larger than the draft angle 539-3 of Fresnel structure 530-3. Accordingly, draft facet 538-7 is less steep than draft facet 538-3. In some embodiments, as shown in FIG. 5D, the draft angle of respective Fresnel structure is determined based on the direction of light incident upon a respective slope facet of the respective Fresnel structure and the direction of the light refracted at the respective slope facet of the Fresnel structure. In FIG. 5D, ray 510-A is incident upon slope facet 536-2 of Fresnel structure 510-2 at a first angle θA. Ray 510-A is transmitted (e.g., refracted) through slope facet 536-2 as ray 510-B at a second angle θB. In some embodiments, a Fresnel lens (e.g., Fresnel lens 530) is an optically transparent substrate (e.g., a substrate made of glass, such as N-BK7, N-SF11, or F2; barium borate; barium fluoride; magnesium fluoride; sapphire; calcium fluoride; fused silica; calcite; a plastic, such as polymethyl methacrylate or polycarbonate; etc.). The direction of ray 510-B, refracted at slope facet 536, is dependent on an optical property (e.g., refractive index) of the Fresnel lens relative to the medium that ray 510-A propagates through (for example, air). In some embodiments, as shown in FIG. 5D, draft facet 538-2 has a draft angle 539-2 that is between first angle θA and second angle second angle θB. Ray 510-A transmitted through slope facet 536-2 does not interact with draft facet 538-2, which reduces stray light, thereby reducing optical artifacts.

In some embodiments, as shown in FIG. 5B, the Fresnel structures 530-n of Fresnel lens 530 have a constant pitch (e.g., 50 µm, 60 µm, 70 µm, 80 µm, 90 µm, 100 µm, 150 µm, 200 µm, 250 µm, 300 µm, 350 µm, 400 µm, 450 µm, 500 µm, 550 µm, 600 µm, 700 µm, 800 µm, 900 µm, 1 mm, 1.1 mm, 1.2 mm, 1.3 mm, 1.4 mm, 1.5 mm, 2 mm, 3 mm, etc.) (e.g., distance 552-7 of Fresnel structure 530-7 is equal to distance 522-3 of Fresnel structure 530-3). In some embodiments, at least a portion of Fresnel structures 350-n of Fresnel lens 530 have a pitch that is larger than or equal to the minimum pitch as determined by equation 1. In some embodiments, when Fresnel lens 320 and Fresnel lens 530 are coupled to one another to form lens assembly 500, light transmitted through lens assembly 500 has a diffraction and/or optical artifacts that is equal to light that is transmitted through Fresnel lens 530. In some embodiments, when coupled, Fresnel lens 320 and Fresnel lens 530 are arranged such that light transmitted through Fresnel lens 530 after passing through Fresnel lens 320 has the same diffraction and/or optical artifacts as light that is transmitted through Fresnel lens 530 without being transmitted through Fresnel lens 320. In some embodiments, when coupled, Fresnel lens 320 and Fresnel lens 530 are arranged such that light transmitted through Fresnel lens 530 after passing through Fresnel lens 320 has diffraction and/or optical artifacts that is no greater than light that is transmitted through Fresnel lens 530 without being transmitted through Fresnel lens 320.

Figure 6A:
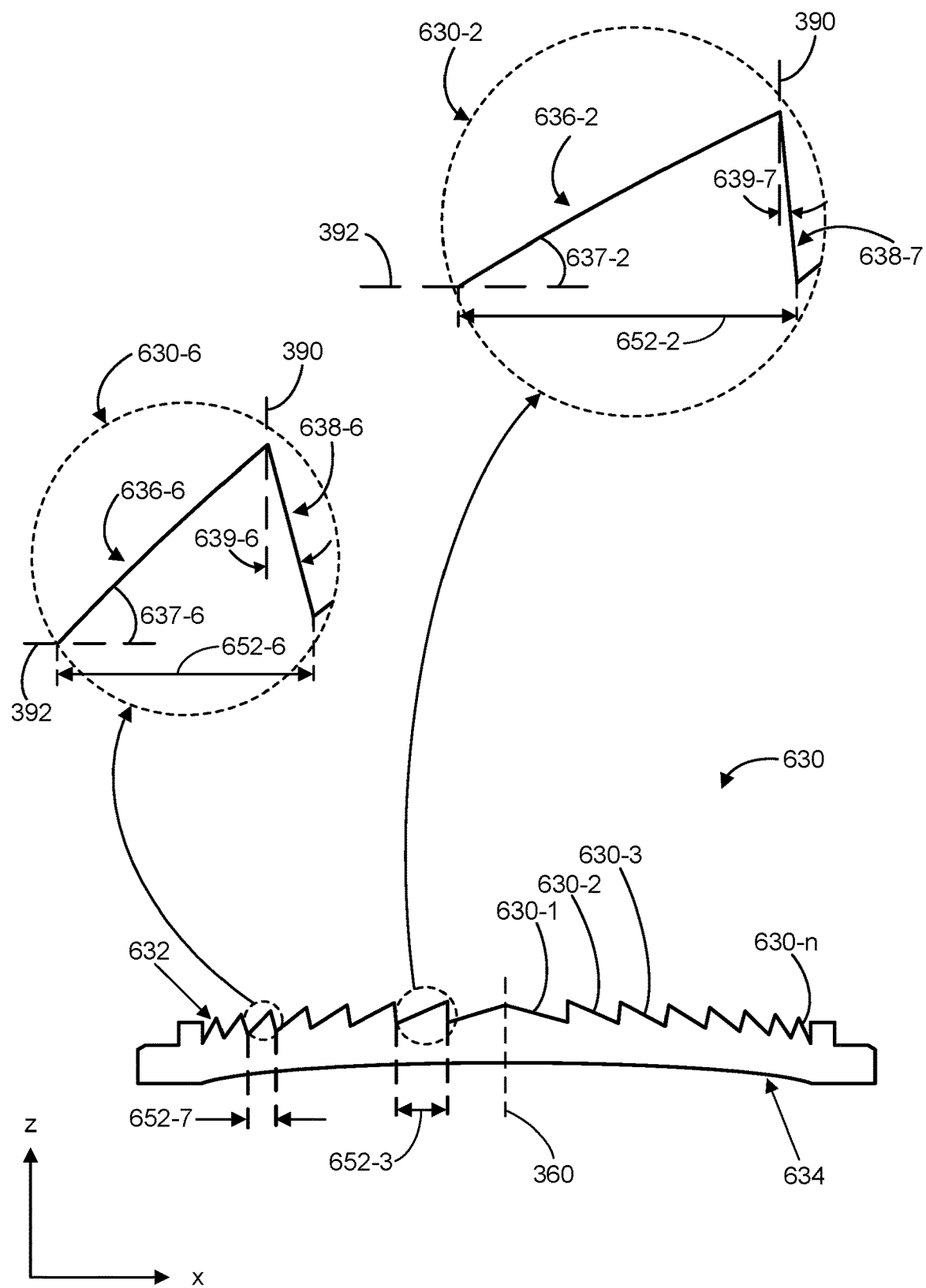
FIG. 6A shows a cross-sectional view of a Fresnel lens with dynamic draft and variable pitch in accordance with some embodiments.

FIG. 6A shows a cross-sectional view of Fresnel lens 630 that has dynamic draft and variable pitch in accordance with some embodiments. Fresnel lens 630 corresponds to Fresnel lens 330-A, which has variable pitch, and Fresnel lens 530, which has dynamic draft. Fresnel lens 630 includes Fresnel structures 630-n that are similar to Fresnel structures 530-n of Fresnel lens 530. The only difference between Fresnel lens 630 and Fresnel lens 530 is that the Fresnel structures 630-n of Fresnel lens 630 have variable pitch (e.g., a Fresnel structure of Fresnel lens 630 has a pitch that differs from the pitch of another Fresnel structure of Fresnel lens 630). The pitch of a respective Fresnel structure is based on the distance of the respective Fresnel structure from an optical axis 360 of Fresnel lens 630. For example, as shown in FIG. 6A, Fresnel structure 630-2, located closer to optical axis than Fresnel structure 630-7, has a larger pitch than Fresnel structure 650-7 (e.g., distance 652-2 is larger than distance 652-7).

In some embodiments, at least a portion of Fresnel structures 630-n of Fresnel lens 530 have a pitch that is larger than or equal to the minimum pitch as determined by equation 1. In some embodiments, when Fresnel lens 320-A and Fresnel lens 630 are coupled to one another to form lens assembly 600 (e.g., a Fresnel lens doublet), light transmitted through lens assembly 600 has diffraction and/or optical artifacts that is equal to or no greater than light that is transmitted through Fresnel lens 630. In some embodiments, coupling Fresnel lens 320-A and Fresnel lens 630 allows Fresnel lens 320-A and Fresnel lens 630 to be arranged such that light transmitted through Fresnel lens 630 after passing through Fresnel lens 320-A has the same diffraction and/or optical artifacts as light that is transmitted through Fresnel lens 630 without being transmitted through Fresnel lens 320-A. In some embodiments, when Fresnel lens 320-A and Fresnel lens 630 are coupled, light transmitted through Fresnel lens 630 after passing through Fresnel lens 320-A diffraction and/or optical artifacts that is no greater than light that is transmitted through Fresnel lens 630 without being transmitted through Fresnel lens 320-A.

Figure 6B:
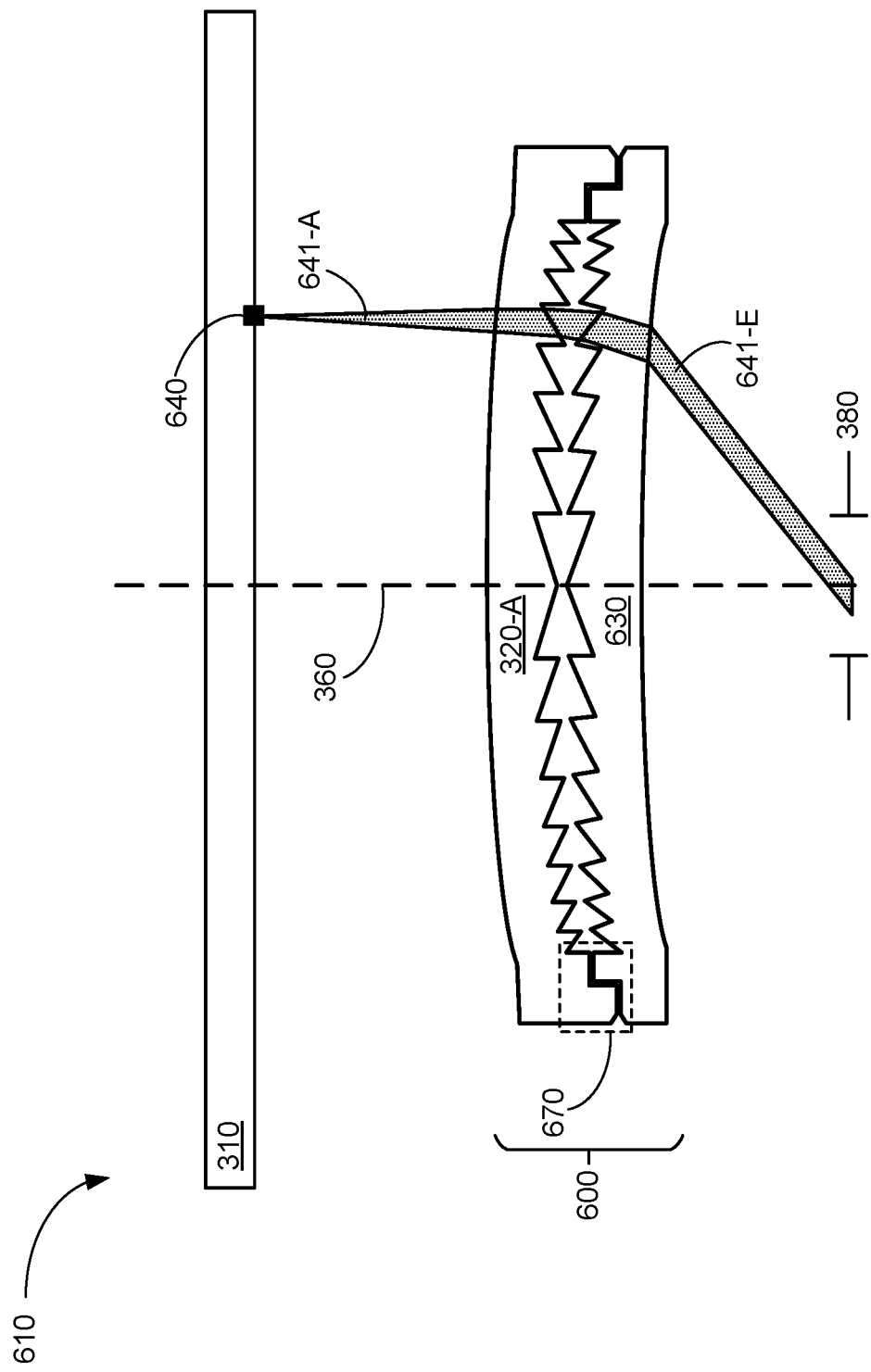
FIGS. 6B-6D illustrate a cross-sectional view of a lens assembly in accordance with some embodiments.
Figure 6C:
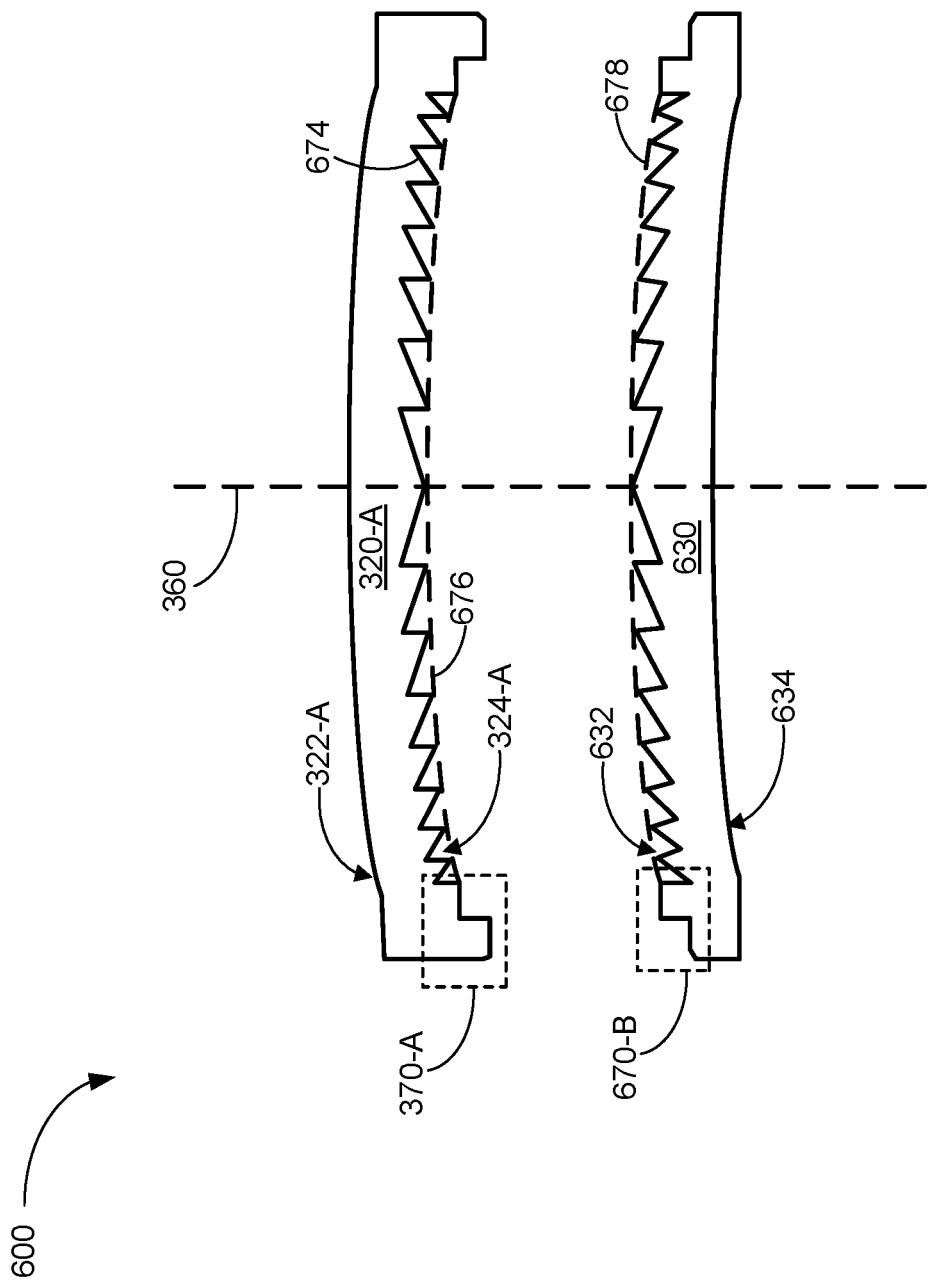
Figure 6D:
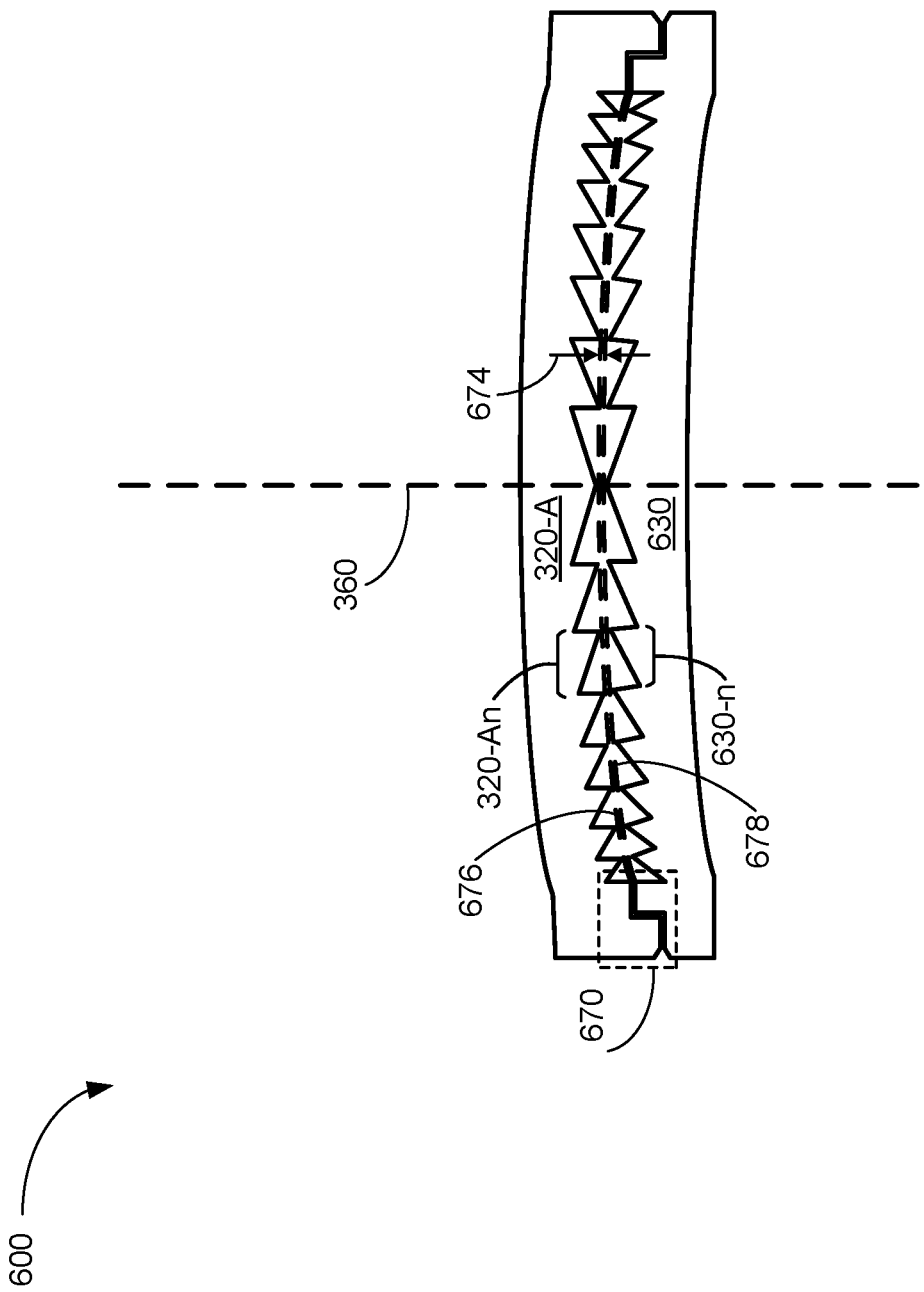

FIGS. 6B-6D illustrate a cross-sectional view of a Fresnel lens doublet in accordance with some embodiments.

FIG. 6B shows a cross-sectional view of display device 610 that includes a display 310 transmitting light through lens assembly 600 toward reference pupil 380. Lens assembly 600 is a Fresnel lens doublet that includes a first Fresnel lens 320-A, described above with respect to FIG. 3D, and a second Fresnel lens 630, described above with respect to FIG. 6A. Lens assembly 600 is configured to provide a wide field of view. In some embodiments, lens assembly 600 can provide a peripheral field of view up to 120° (e.g., for an eye relief distance of 25 mm). Due to the inclusion of Fresnel lens 630, which has dynamic draft and variable pitch, and Fresnel lens 320-A, which has variable pitch, lens assembly 600 has fewer optical artifacts compared to lens assembly 500 and lens assembly 300.

Display device 610 is analogous to display device 202 with lens assembly 300 replaced by lens assembly 600. Thus, details that are described above are not repeated here for brevity. Lens assembly 600 is configured to receive light (e.g., ray 641-A) emitted from an off-axis position (e.g., off-axis position 640) of display 310 and to transmit the light (e.g., transmit ray 641-A as ray 641-E) to reference pupil 380. Rays 641-A to 641-E follow the same optical path as rays 345-A to 645-E, described above with respect to FIG. 3A.

FIG. 6C shows a cross-sectional view of lens assembly 600 in accordance with some embodiments. In FIG. 6C, Fresnel lens 320-A and Fresnel lens 630 of lens assembly 600 are shown separated for ease of illustration.

Dashed line 376 shows the concave outline of second surface of Fresnel lens 320-A. Dashed line 678 shows the convex outline of first surface 632 of Fresnel lens 630. When Fresnel lens 320-A and Fresnel lens 630 are arranged (e.g., coupled) as lens assembly 600, the second surface of Fresnel lens 320-A and the first surface 632 of Fresnel lens 630 are separated by a distance 674, which is analogous to distance 374, described above with respect to FIG. 3F.

Fresnel lens 320-A and Fresnel lens 630 are optionally slidingly coupled to one another through optional coupling structure 670, which is analogous to optional coupling structure 370. Optional coupling structure 670 includes a first portion 370-A, described above with respect to FIG. 3F, and a second portion 670-B, analogous to portion 370-B described above with respect to FIG. 3F.

FIG. 6D shows a cross sectional view of Fresnel lens 320-A and Fresnel lens 630 when they are slidingly coupled using optional coupling structure 670 (e.g., optional coupling mechanism 670) to form the Fresnel lens doublet.

In light of these principles, we now turn to certain embodiments of lens assemblies.

In accordance with some embodiments, a lens assembly (e.g., lens assemblies 300, 500, 600) includes a first lens (e.g., Fresnel lens 320, 320-A) and a second lens (e.g., Fresnel lens 330, 330-A, 530, 630). The first lens has a first lens surface (e.g., surface 322) and a second lens surface (e.g., surface 324) that is opposite to the first lens surface. The second lens surface includes a first plurality of Fresnel structures (e.g., Fresnel structures 320-n, which include Fresnel structures 323-n and 325-n). The second lens, coupled to the first lens, has a third lens surface (e.g., surface 332) and a fourth lens surface (e.g., surface 334) that is opposite to the third lens surface. The third lens surface includes a second plurality of Fresnel structures (e.g., Fresnel structures 330-n). The third lens surface faces the first lens and the second lens surface faces the second lens.

In some embodiments, a respective Fresnel structure of the first plurality of Fresnel structures (e.g., Fresnel structure 320-n) has a draft facet (e.g., draft facet 328), characterized by a draft angle (e.g., draft angle 329), and a slope facet (e.g., slope facet 326). A respective Fresnel structure of the second plurality of Fresnel structures (e.g., Fresnel structure 330-n) has a slope facet (e.g., slope facet 336) and a draft facet (e.g., draft facet 338). The first lens (e.g., Fresnel lens 320) and the second lens (e.g., Fresnel lens 330) are configured to project light from a display (e.g., display 310) to an image plane (e.g., reference pupil 380). A respective ray (e.g., ray 345-A) of the light projected from a respective location (e.g., off-axis position 344) of the display to the image plane passes through a respective slope facet of the first plurality of Fresnel structures (e.g., slope facet of Fresnel structure 320-10). The respective ray of the light (e.g., ray 345-C) projected from the respective location of the display to the image plane and passing through the respective slope facet of the first plurality of Fresnel structures passes through a respective slope facet of the second plurality of Fresnel structures (e.g., slope facet of Fresnel structure 330-10).

In some embodiments, a respective Fresnel structure of the first plurality of Fresnel structures corresponds to a distinct Fresnel structure of the second plurality of Fresnel structures (e.g., Fresnel structure 320-10 corresponds to Fresnel structure 330-10).

In some embodiments, a number of Fresnel structures in the first plurality of Fresnel structures is identical to a number of Fresnel structures in the second plurality of Fresnel structures (e.g., Fresnel structures 320-n includes the same number of Fresnel structures as Fresnel structures 330-n).

In some embodiments, the first plurality of Fresnel structures is separated from the second plurality of Fresnel structures (e.g., by a gap, such as an air gap). In some embodiments, the first plurality of Fresnel structures is mutually exclusive to the second plurality of Fresnel structures.

In some embodiments, the first plurality of Fresnel structures is separated from the second plurality of Fresnel structures by a gap that is much smaller than 1 millimeter. In some embodiments, the gap is less than any of 100, 200, 300, 400, or 500 micrometers. The gap is defined as a distance between a baseline of the second lens surface and a baseline of the third lens surface. The baselines pass through the tips of the Fresnel structures, thereby defining the shape of the lens (e.g., a meniscus shape).

In some embodiments, the first lens (e.g., Fresnel lens 320) has a first meniscus shape having a first center of curvature and the second lens (e.g., Fresnel lens 330) has a second meniscus shape having a second center of curvature.

In some embodiments, the first center of curvature is located adjacent to the second surface and the second center of curvature is located adjacent to the fourth surface (e.g., the centers of the curvatures are on the side of an eye).

In some embodiments, the first center of curvature corresponds to (e.g., is the same as) the second center of curvature. In some embodiments, the first center of curvature and the second center of curvature are the same.

In some embodiments, the first lens surface (e.g., surface 322) is a smooth surface and the fourth lens surface (e.g., surface 334) is a smooth surface.

In some embodiments, a first Fresnel structure (e.g., Fresnel structure 530-3) of the second plurality of Fresnel structures (e.g., Fresnel structures 530-n), located at a first distance from an optical axis (e.g., optical axis 360) of the second lens (e.g., Fresnel lens 530), includes a first draft facet (e.g., draft facet 538-3), characterized by a first draft angle (e.g., draft angle 539-3), and a first slope facet (e.g., slope facet 536-3). A second Fresnel structure (e.g., Fresnel structure 530-7) of the second plurality of Fresnel structures, located at a second distance from the optical axis of the second lens, includes a second draft facet (e.g., draft facet 538-7), characterized by a second draft angle (e.g., draft angle 539-7) that is distinct from the first draft angle, and a second slope face (e.g., slope facet 536-7). The second distance is distinct (e.g., different) from the first distance (e.g., Fresnel structure 530-7 and Fresnel structure 530-3 are located at different distances away from optical axis 360 of Fresnel lens 530).

In some embodiments, the second draft angle is greater than the first draft angle (e.g., draft angle 539-3 is larger than draft angle 539-7).

In some embodiments, each Fresnel structure of the first plurality of Fresnel structures includes a draft facet, characterized by a constant draft angle, and a slope facet (e.g., the first plurality of Fresnel structures does not have a dynamic draft) (e.g., Fresnel structures 320-n of Fresnel lens 320 have the same draft angle). In some embodiments, the draft angle is 2 degrees.

In some embodiments, the first plurality of Fresnel structures (e.g., Fresnel structures 320-n) includes a first Fresnel structure (e.g., Fresnel structure 320-10) that has a first slope facet and a first draft facet. The second plurality of Fresnel structures (e.g., Fresnel structures 330-n) includes a third Fresnel structure (e.g., Fresnel structure 330-10) that has a third slope face and a third draft facet. The first Fresnel structure is configured to receive first light (e.g., ray 435-A) and to direct a first portion (e.g., ray 435-B and 435-C) of the first light through the first slope facet to the third slope facet of the third Fresnel structure without transmitting the first light through the first slope facet to the third draft facet (e.g., Fresnel structure 320-10 is configured to receive ray 435-A, transmit ray 435-B through the slope facet of Fresnel structure 320-10 as ray 435-C, and direct ray 435-C through the slope facet of Fresnel structure 330-10).

In some embodiments, a first Fresnel structure (e.g., Fresnel structure 330-A2) of the second plurality of Fresnel structures, located at a first distance from an optical axis (e.g., optical axis 360) of the second Fresnel lens (e.g., Fresnel lens 330-A), is characterized by a first pitch (e.g., distance 356-2). A second Fresnel structure (e.g., Fresnel structure 330-A7) of the second plurality of Fresnel structures, located at a second distance from the optical axis of the second lens, is characterized by a second pitch (e.g., distance 356-7) that is distinct from the first pitch. The first distance is distinct from the second distance (e.g., Fresnel structure 330-A2 is located a different distance away from optical axis 360 than Fresnel structure 330-A7). In some embodiments, the pitch follows a pitch rule described by equation 1.

In some embodiments, the first lens has one or more protrusions positioned near an edge of the first lens and the second lens has one or more notches positioned near an edge of the second lens. The one or more protrusions of the first lens are configured to slidingly couple with the one or more notches of the second lens (e.g., first portion 370-A of coupling structure 370, located on Fresnel lens 320, is configured to slidingly couple with second portion 370-B of coupling structure 370, located on Fresnel lens 330).

In accordance with some embodiments, a headset (e.g., display device 202) comprises a display (e.g., display 310) and a lens assembly (e.g., lens assembly 300). The lens assembly includes a first lens (e.g., Fresnel lens 320) and a second lens (e.g., Fresnel lens 330) configured to project light from the display to an image plane (e.g., reference pupil 380). The first lens has a first lens surface (e.g., surface 322) and a second lens surface (e.g., surface 324) opposite to the first lens surface. The second lens surface includes a first plurality of Fresnel structures (e.g., Fresnel structures 320-n). A respective Fresnel structure of the first plurality of Fresnel structures has a draft facet (e.g., draft facet 328), characterized by a draft angle (e.g., draft angle 329), and a slope facet (e.g., slope facet 326). The second lens is coupled with the first lens so that at least a portion of light transmitted through the first lens is transmitted through the second lens. The second lens has a third lens surface (e.g., surface 332) and a fourth lens (e.g., surface 334) surface opposite to the third lens surface. The third lens surface includes a second plurality of Fresnel structures (e.g., Fresnel structures 330-n). A respective Fresnel structure of the second plurality of Fresnel structures has a slope facet (e.g., slope facet 336) and a draft facet (e.g., draft facet 338). A respective ray of the light projected from a respective location of the display to the image plane passes through a respective slope facet of the first plurality of Fresnel structures and a respective slope facet of the second plurality of Fresnel structures (e.g., ray 435-A, transmitted from off-axis position 344 on display 310, is transmitted through a slope facet of Fresnel structure 320-10 and a slope facet of Fresnel structure 330-10).

In some embodiments, the lens assembly (e.g., lens assembly 300, 500, 600) is configured to provide a peripheral field of view greater than 120 degrees from the image plane (e.g., reference pupil 380) toward the display (e.g., display 310).

In accordance with some embodiments, a lens assembly includes a first lens (e.g., Fresnel lens 320) and a second lens (e.g., Fresnel lens 330). The first lens has a first lens surface (e.g., surface 322) and a second lens surface (e.g., surface 324) opposite to the first lens surface. The second lens surface includes a first plurality of Fresnel structures (e.g., Fresnel structures 320-n). A respective Fresnel structure of the first plurality of Fresnel structures has a draft facet (e.g., draft facet 328), characterized by a draft angle (e.g., draft angle 329), and a slope facet (e.g., slope facet 326). The second lens has a third lens surface (e.g., surface 332) and a fourth lens (e.g., surface 334) surface opposite to the third lens surface. The third lens surface includes a second plurality of Fresnel structures (e.g., Fresnel structures 330-n). A respective Fresnel structure of the second plurality of Fresnel structures has a slope facet (e.g., slope facet 336) and a draft facet (e.g., draft facet 338). A method of transmitting, with a lens assembly, light from a display (e.g., display 310) toward an image plane (e.g., reference pupil 380) includes transmitting a respective ray from a respective location of the display to the image plane through a respective slope facet of the first plurality of Fresnel structures and a respective slope facet of the second plurality of Fresnel structures (e.g., ray 435-A, transmitted from off-axis position 344 on display 310, is transmitted through a slope facet of Fresnel structure 320-10 and a slope facet of Fresnel structure 330-10).

In some embodiments, all of the rays transmitted from the display (e.g., display 310) to the image plane (e.g., reference pupil 380) pass through respective slope facets of the first plurality of Fresnel structures and respective slope facets of the second plurality of Fresnel structures (e.g., see rays 341-A to 341-E, 343-A to 343-E, and 345-A to 343-E).

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A lens assembly, comprising:
a first lens having a first lens surface and a second lens surface opposite to the first lens surface, the second lens surface including a first plurality of Fresnel structures, wherein the first plurality of Fresnel structures includes a first Fresnel structure with (i) a first slope facet characterized by a first slope angle and (ii) a first draft facet; and
a second lens coupled with the first lens, the second lens having a third lens surface and a fourth lens surface opposite to the third lens surface, the third lens surface including a second plurality of Fresnel structures, wherein the second plurality of Fresnel structures includes a second Fresnel structure with (i) a second slope facet characterized by a second slope angle and (ii) a second draft facet, wherein:
the third lens surface faces the first lens and the second lens surface faces the second lens; and
the first slope angle is distinct from the second slope angle so that the first Fresnel structure receives a first light and directs a portion of the first light through the first slope facet to the second slope facet of the second Fresnel structure without transmitting the first light through the first slope facet to the second draft facet.

2. The lens assembly of claim 1, wherein:
a respective Fresnel structure of the first plurality of Fresnel structures has a slope facet and a draft facet, wherein the draft facet is characterized by a draft angle;
a respective Fresnel structure of the second plurality of Fresnel structures has a slope facet and a draft facet;
the first lens and the second lens are configured to project light from a display to an image plane;
a respective ray of the light projected from a respective location of the display to the image plane passes through a respective slope facet of the first plurality of Fresnel structures; and
the respective ray of the light projected from the respective location of the display to the image plane and passing through the respective slope facet of the first plurality of Fresnel structures passes through a respective slope facet of the second plurality of Fresnel structures.

3. The lens assembly of claim 1, wherein:
a respective Fresnel structure of the first plurality of Fresnel structures corresponds to a distinct Fresnel structure of the second plurality of Fresnel structures.

4. The lens assembly of claim 1, wherein:
a number of Fresnel structures in the first plurality of Fresnel structures is identical to a number of Fresnel structures in the second plurality of Fresnel structures.

5. The lens assembly of claim 1, wherein:
the first plurality of Fresnel structures is separated from the second plurality of Fresnel structures.

6. The lens assembly of claim 5, wherein:
the first plurality of Fresnel structures is separated from the second plurality of Fresnel structures by a gap less than 1 mm.

7. The lens assembly of claim 1, wherein:
the first lens has a first meniscus shape having a first center of curvature and the second lens has a second meniscus shape having a second center of curvature.

8. The lens assembly of claim 7, wherein:
the first center of curvature is located adjacent to the second lens surface and the second center of curvature is located adjacent to the fourth lens surface.

9. The lens assembly of claim 8, wherein:
the first center of curvature corresponds to the second center of curvature.

10. The lens assembly of claim 1, wherein:
the first lens surface is a smooth surface and the fourth lens surface is a smooth surface.

11. The lens assembly of claim 1, wherein:
the second Fresnel structure is located at a first distance from an optical axis of the second lens, wherein the second draft facet is characterized by a first draft angle; and
the second plurality of Fresnel structures also includes a third Fresnel structure located at a second distance, distinct from the first distance, from the optical axis of the second lens, the third Fresnel structure including a third slope facet and a third draft facet, wherein the third draft facet is characterized by a second draft angle that is distinct from the first draft angle.

12. The lens assembly if claim 11, wherein:
the second draft angle is greater than the first draft angle.

13. The lens assembly of claim 11, wherein:
each Fresnel structure of the first plurality of Fresnel structures includes a slope facet and a draft facet, wherein the draft facet is characterized by a constant draft angle.

14. The lens assembly of claim 1, wherein:
the second Fresnel structure is located at a first distance from an optical axis of the second lens and is characterized by a first pitch; and
the second plurality of Fresnel structures also includes a third Fresnel structure located at a second distance, distinct from the first distance, from the optical axis of the second lens and the third Fresnel structure is characterized by a second pitch that is distinct from the first pitch.

15. The lens assembly of claim 1, wherein:
the first lens has one or more protrusions positioned near an edge of the first lens and the second lens has one or more notches positioned near an edge of the second lens, wherein the one or more protrusions of the first lens are configured to slidingly couple with the one or more notches of the second lens.

16. The lens assembly of claim 1, wherein:
the second draft facet is curved so that the second draft facet does not receive the portion of the first light directed by the first Fresnel structure.

17. The lens assembly of claim 1, wherein:
at least a portion of the first plurality of Fresnel structures has a planar baseline; and at least a portion of the second plurality of Fresnel structures has a planar baseline.

18. A headset, comprising:
a display; and
a lens assembly that includes:
  a first lens having a first lens surface and a second lens surface opposite to the first lens surface, the second lens surface including a first plurality of Fresnel structures, wherein the first plurality of Fresnel structures includes a first Fresnel structure with (i) a first slope facet characterized by a first slope angle and (ii) a first draft facet; and
  a second lens coupled with the first lens so that at least a portion of light transmitted through the first lens is transmitted through the second lens, the second lens having a third lens surface and a fourth lens surface opposite to the third lens surface, the third lens surface including a second plurality of Fresnel structures, wherein the second plurality of Fresnel structures includes a second Fresnel structure with (i) a second slope facet characterized by a second slope angle and (ii) a second draft facet, wherein:
  the first lens and the second lens are configured to project light from the display to an image plane; and
  the first slope angle is distinct from the second slope angle so that all rays of the light projected from a respective location of the display to the image plane passes through a respective slope facet of the first plurality of Fresnel structures pass through a corresponding slope facet of the second plurality of Fresnel structures.

19. The headset of claim 18, wherein
the lens assembly is configured to provide a field of view greater than 120 degrees from the image plane toward the display.

20. A method, comprising:
transmitting, with a lens assembly, light from a display toward an image plane, wherein the lens assembly includes:
  a first lens having a first lens surface and a second lens surface opposite to the first lens surface, the second lens surface including a first plurality of Fresnel structures;
  a second lens coupled with the first lens, the second lens having a third lens surface and a fourth lens surface opposite to the third lens surface, the third lens surface including a second plurality of Fresnel structures;
  a respective Fresnel structure of the first plurality of Fresnel structures has a slope facet and a draft facet; and
  a respective Fresnel structure of the second plurality of Fresnel structures has a slope facet and a draft facet,
wherein:
  transmitting the light from the display toward the image plane includes transmitting a respective ray from a respective location of the display to the image plane through a respective slope facet of the first plurality of Fresnel structures and a corresponding slope facet of the second plurality of Fresnel structures; and
  the respective slope facet of the first plurality of Fresnel structures is characterized by a first slope angle that is distinct from a second slope angle that characterizes the corresponding slope facet of the second plurality of Fresnel structures so that all of the rays transmitted from the display to the image plane pass through respective slope facets of the first plurality of Fresnel structures and respective slope facets of the second plurality of Fresnel structures.

* * * * *

UNITED STATES PATENT AND TRADEMARK OFFICE
CERTIFICATE OF CORRECTION

PATENT NO. : 11,454,747 B1
APPLICATION NO. : 16/780731
DATED : September 27, 2022
INVENTOR(S) : Wheelwright et al.

It is certified that error appears in the above-identified patent and that said Letters Patent is hereby corrected as shown below:

In the Claims

Claim 18, Column 27, Line 27-28, please delete "plane passes through" and insert --plane through--.

Signed and Sealed this
Seventeenth Day of January, 2023

Katherine Kelly Vidal
*Director of the United States Patent and Trademark Office*